United States Patent
Madukkarumukumana et al.

(10) Patent No.: US 7,340,582 B2
(45) Date of Patent: Mar. 4, 2008

(54) FAULT PROCESSING FOR DIRECT MEMORY ACCESS ADDRESS TRANSLATION

(75) Inventors: Rajesh Madukkarumukumana, Portland, OR (US); Ioannis Schoinas, Portland, OR (US); Ku-jei King, Taipei Hsien (TW); Balaji Vembu, Folsom, CA (US); Gilbert Neiger, Portland, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 10/956,630

(22) Filed: Sep. 30, 2004

(65) Prior Publication Data

US 2006/0075285 A1    Apr. 6, 2006

(51) Int. Cl.
G06F 12/00 (2006.01)
G06F 13/00 (2006.01)
(52) U.S. Cl. .................. 711/202; 711/100; 711/200
(58) Field of Classification Search .............. 714/5, 714/4; 711/100, 154, 170, 200, 202
See application file for complete search history.

(56) References Cited

U.S. PATENT DOCUMENTS

| | | | |
|---|---|---|---|
| 5,685,011 A | 11/1997 | Rosenthal et al. | |
| 5,987,585 A * | 11/1999 | Motoyama et al. | 712/1 |
| 6,237,079 B1 * | 5/2001 | Stoney | 712/34 |
| 6,311,258 B1 * | 10/2001 | Gibson et al. | 711/200 |
| 6,418,488 B1 * | 7/2002 | Chilton et al. | 710/20 |
| 6,507,898 B1 * | 1/2003 | Gibson et al. | 711/168 |
| 6,594,785 B1 * | 7/2003 | Gilbertson et al. | 714/48 |
| 6,625,688 B1 * | 9/2003 | Fruehling et al. | 711/109 |
| 6,708,291 B1 | 3/2004 | Kidder | |

OTHER PUBLICATIONS

"Logical Partition Security in the IBM eserver pSeries 690", IBM White Paper, Feb. 2002, XP002361913.
Barham P. et al., "Xen and the Art of Virtualization", Proceedings of the ACM Symposium on Operating Systems Principles, Oct. 2003, pp. 164-177, XP002298786.

* cited by examiner

*Primary Examiner*—Tuan V. Thai
(74) *Attorney, Agent, or Firm*—Philip A. Pedigo

(57) ABSTRACT

An embodiment of the present invention is a technique to process faults in a direct memory access address translation. A register set stores global control or status information for fault processing of a fault generated by an input/output (I/O) transaction requested by an I/O device. An address translation structure translates a guest physical address to a host physical address. The guest physical address corresponds to the I/O transaction and is mapped to a domain. The address translation structure has at least an entry associated with the domain and domain-specific control information for the fault processing.

52 Claims, 15 Drawing Sheets

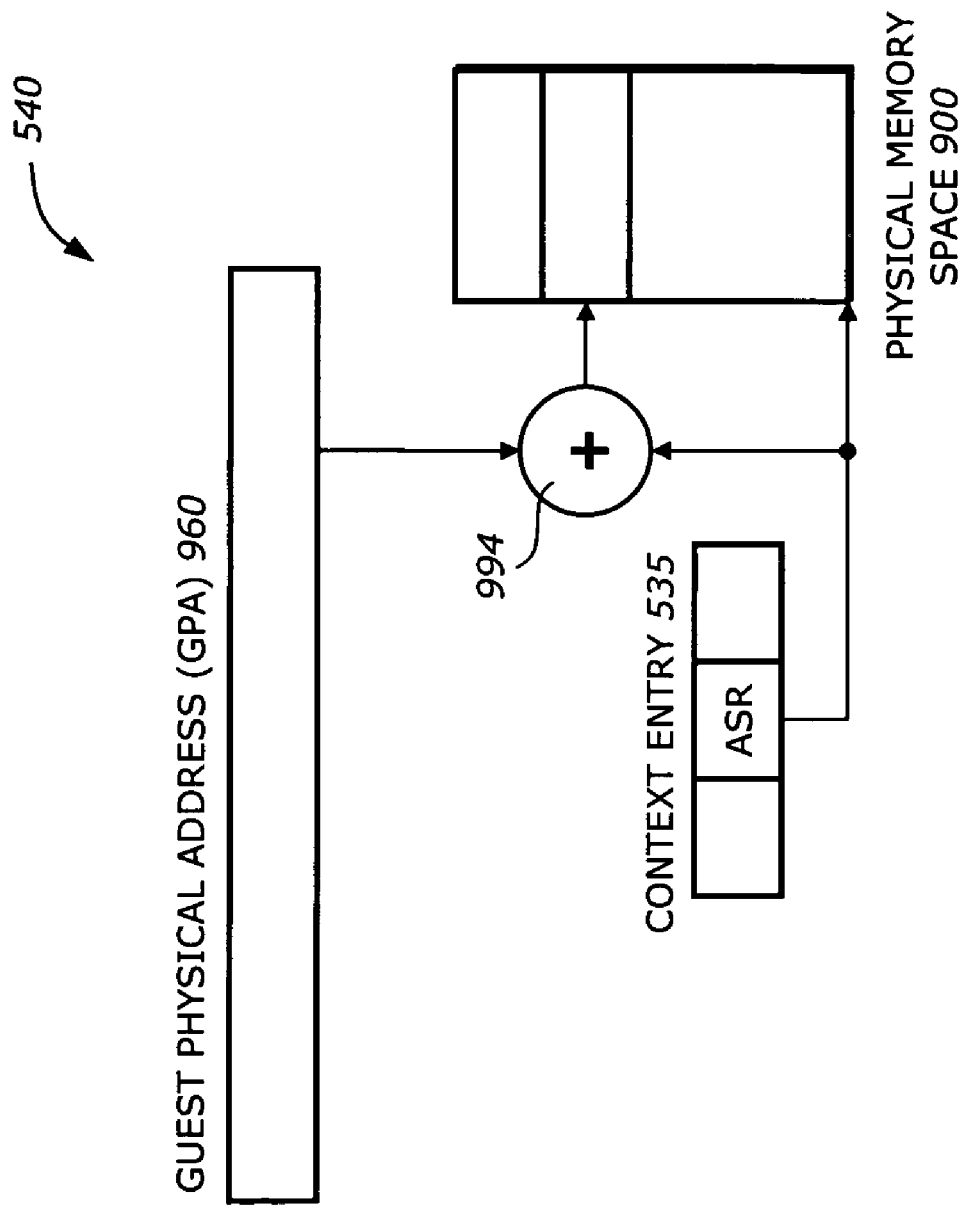

FAULT PROCESSING FOR DIRECT MEMORY ACCESS ADDRESS TRANSLATION

BACKGROUND

1. Field of the Invention

Embodiments of the invention relate to the field of microprocessors, and more specifically, to input/output (I/O) virtualization.

2. Description of Related Art

As microprocessor architecture becomes more and more complex to support high performance applications, I/O management presents a challenge.

Existing techniques to address the problem of I/O management have a number of disadvantages. One technique uses software-only I/O virtualization to support virtual machine (VM) I/O. This technique has limited functionality, performance, and robustness. The functionality seen by the guest operating system (OS) and applications is limited by the functionality supported by the virtual devices emulated in the VM monitor (VMM) software. The guest I/O operations are trapped by the VMM and proxied or emulated before being submitted to the underlying physical-device hardware, resulting in poor performance. In addition, all or parts of the device driver for the hardware device are run as part of the privileged VMM software, which may adversely affect overall robustness of the platform. Techniques using specialized translation structures can only support a specific device or a limited usage model. General I/O memory management units provide only support for I/O virtual address spaces of limited size or complexity.

BRIEF DESCRIPTION OF THE DRAWINGS

The embodiments of invention may best be understood by referring to the following description and accompanying drawings that are used to illustrate embodiments of the invention. In the drawings:

FIG. 9C is a diagram illustrating an address translation structure using base/bound translation according to one embodiment of the invention.

DESCRIPTION

An embodiment of the present invention is a technique to process faults in a direct memory access address translation. A register set stores global control or status information for fault processing of a fault generated by an input/output (I/O) transaction requested by an I/O device. An address translation structure translates a guest physical address to a host physical address. The guest physical address corresponds to the I/O transaction and is mapped to a domain. The address translation structure has at least an entry associated with the domain and domain-specific control information for the fault processing.

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
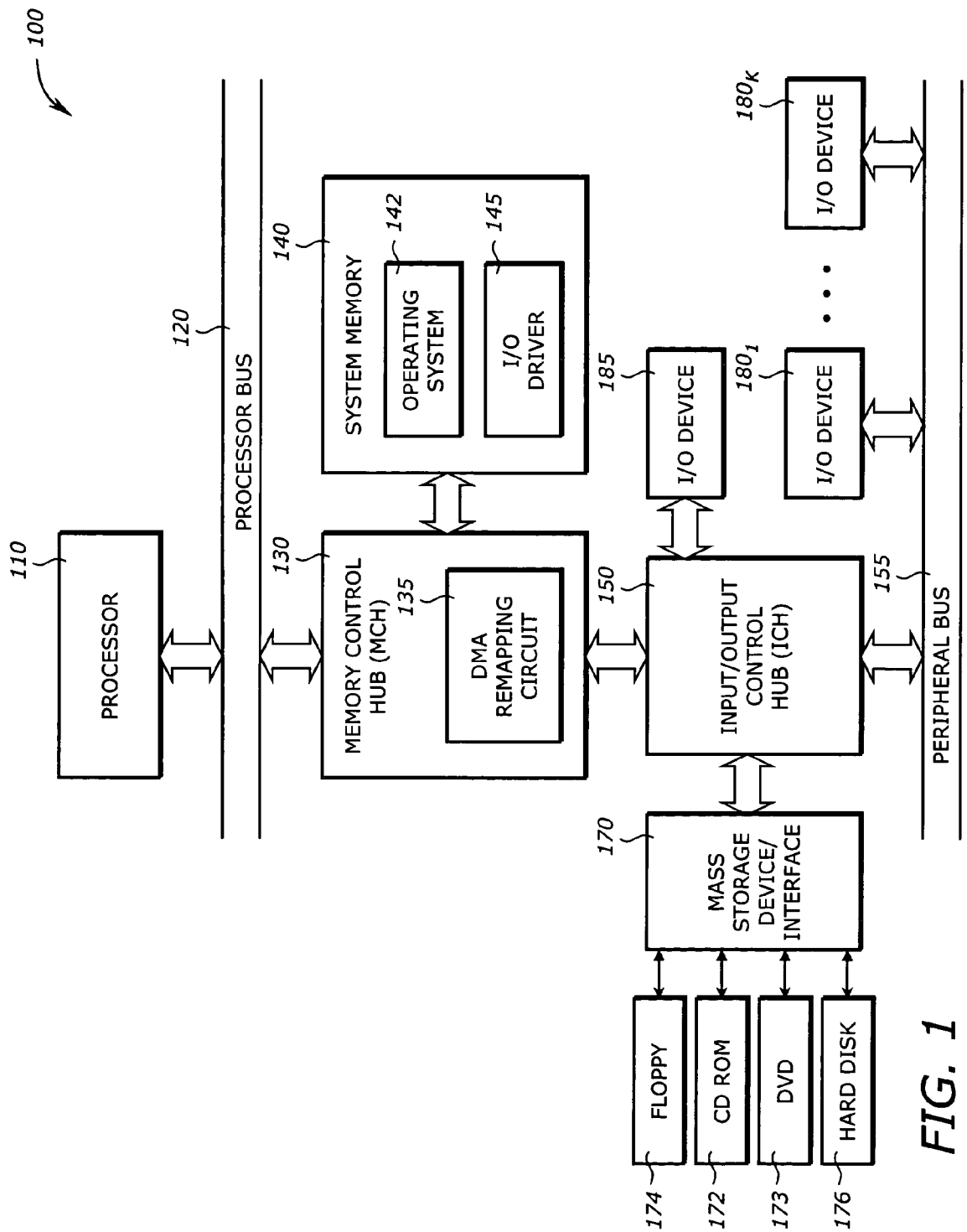
FIG. 1 is a diagram illustrating a system in which one embodiment of the invention can be practiced.

FIG. 1 is a diagram illustrating a system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device/interface 170, and input/output devices $180_1$ to $180_K$, and 185. Note that the system 100 may include more or less elements than the above.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155 directly or via the ICH 150. For clarity, not all the peripheral buses are shown. It is contemplated that the system 100 may also include peripheral buses such as Peripheral Component Interconnect (PCI), PCI Express, accelerated graphics port (AGP), Industry Standard Architecture (ISA) bus, and Universal Serial Bus (USB), etc.

The MCH 130 includes a direct memory access (DMA) remapping circuit 135. The DMA remapping circuit 135 maps an I/O device (e.g., one of the I/O device $180_1$ to $180_K$ and 185) into a domain in the system memory 140 in an I/O transaction. The I/O transaction is typically a DMA request. The DMA remapping circuit 135 provides hardware support to facilitate or enhance I/O device assignment and/or management. The DMA remapping circuit 135 may also be included in any chipset other than the MCH 130, such as the ICH 150. It may also be implemented, partly or wholly, in the processor 10, or as a separate processor or co-processor to other processors or devices.

The system memory 140 stores system code and data. The system memory 140 is typically implemented with dynamic random access memory (DRAM) or static random access memory (SRAM). The system memory may include program code or code segments implementing one embodiment of the invention. The system memory includes an operating system (OS) 142, or a portion of the OS, or a kernel, and an I/O driver 145. Any one of the elements of the OS 142 or the I/O driver 145 may be implemented by hardware, software, firmware, microcode, or any combination thereof. The system memory 140 may also include other programs or data which are not shown.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device/interface 170 provides storage of archive information such as code, programs, files, data, applications, and operating systems. The mass storage device/interface 170 may interface to a compact disk (CD) ROM 172; a digital video/versatile disc (DVD) 173, a floppy drive 174, and a hard drive 176, and any other magnetic or optic storage devices. The mass storage device/interface 170 provides a mechanism to read machine-accessible media. The machine-accessible media may contain computer readable program code to perform tasks as described in the following.

The I/O devices $180_1$ to $180_K$ may include any I/O devices to perform I/O functions including DMA requests. They are interfaced to the peripheral bus 155. Examples of I/O devices $180_1$ to $180_K$ include controller for input devices (e.g., keyboard, mouse, trackball, pointing device), media card (e.g., audio, video, graphics), network card, and any other peripheral controllers. The I/O device 185 is interfaced directly to the ICH 150. The peripheral bus 155 is any bus that supports I/O transactions. Examples of the peripheral bus 155 include the PCI bus, PCI Express, etc.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, read only memory, erasable read only memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

In a standard computing platform, the I/O subsystem components function as part of a single domain and are managed by the operating-system software. One embodiment of the invention provides the hardware support required to assign I/O devices in a computing platform to multiple domains.

A domain is abstractly defined as an isolated environment in the platform, to which a sub-set of the host physical memory is allocated. The host physical memory is included in the system memory 140. I/O devices that are allowed to directly access the physical memory that is allocated to a domain are referred to as the domain's assigned devices. The isolation property of a domain is achieved by blocking access to its physical memory from resources not assigned to it. Multiple isolated domains are supported by ensuring all I/O devices are assigned to some domain (possibly a default domain), and by restricting access from each assigned device only to the physical memory allocated to its domain.

Each domain has a view of physical memory, or a physical address space, that may be different than the system view of physical memory. Addresses used by a domain's resources to access its physical address space is referred to as its guest physical address (GPA). The host physical address (HPA) refers to the system physical address used to access memory. A domain is considered relocated if its GPA is translated to a new HPA to access its allocated system physical memory. A domain is referred to as non-relocated if its guest physical address space is the same as, or a subset of, the system's host physical address space. The logical separation of GPA and HPA provides the basis for enforcing memory protection. It requires a physical-address translation and a protection mechanism that can validate guest physical addresses generated by a domain's assigned devices and translate it to valid host physical addresses. The DMA remapping circuit 135 provides this hardware support.

For assigning I/O devices to domains, physical-address translation and protection are applied for DMA requests from all I/O devices in the platform. For simplicity, the physical address translation functionality for I/O device DMA requests is referred to as DMA remapping.

Figure 2:
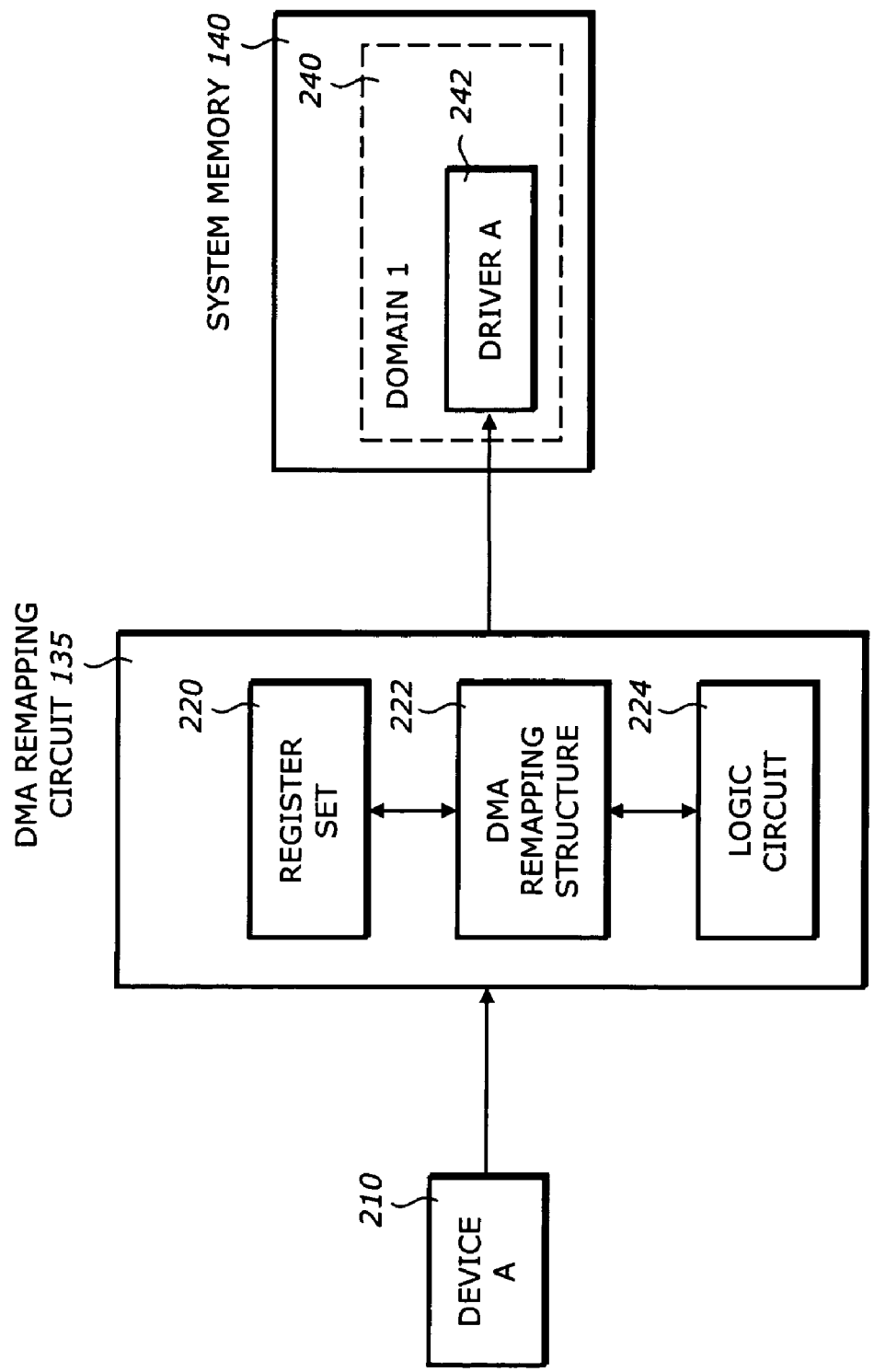
FIG. 2 is a diagram illustrating an input/output (I/O) device assignment according to one embodiment of the invention.

FIG. 2 is a diagram illustrating an input/output (I/O) device assignment according to one embodiment of the invention. The I/O device assignment is a mapping of an I/O device to a domain in the system memory 140. The mapping is supported by the DMA remapping circuit 135. As an example, device A 210 is mapped into domain 1 240 in the system memory 140. The domain 1 may have a driver 242 for the device A 210. More than one driver may also be used The DMA remapping circuit 135 includes a register set 220, a DMA remapping structure 222, and a logic circuit 224. The register set 220 includes a number of registers that provides control or status information used by the DMA remapping structure 222, the logic circuit 224, and the programs or drivers for the I/O devices. The DMA remapping structure 222 provides the basic structure, storage, or tables used in the remapping or address translation of the guest physical address to the host physical address in an appropriate domain. The logic circuit 224 includes circuitry that performs the remapping or address translation operations and other interfacing functions. The DMA remapping circuit 135 may have different implementations to support different configurations and to provide different capabilities for the remapping or address translation operations.

The I/O device assignment and/or management using the DMA remapping circuit 135 provides a number of usages or applications. Two useful applications are OS robustness applications and virtualization applications.

OS Robustness applications: Domain isolation has multiple uses for operating-system software. For example, an OS may define a domain containing its critical code and data structures in memory, and restrict access to this domain from all I/O devices in the system. This allows the OS to limit erroneous or unintended corruption of its data and code through incorrect programming of devices by device drivers, thereby improving its robustness.

In another usage, the OS may use domains to better manage DMA from legacy 32-bit PCI devices to high memory (above 4 GB). This is achieved by allocating 32-bit devices to one or more domains and programming the I/O-physical-address-translation mechanism to remap the DMA from these devices to high memory. Without such support, the software has to resort to data copying through OS bounce buffers.

In a more involved usage, an OS may manage I/O by creating multiple domains and assigning one or more I/O devices to the individual domains. In this usage, the device drivers explicitly register their I/O buffers with the OS, and the OS assigns these I/O buffers to specific domains, using hardware to enforce the DMA domain protections. In this model, the OS uses the I/O address translation and protection mechanism as an I/O memory management unit (I/O MMU).

Virtualization applications: The virtualization technology allows for the creation of one or more virtual machines (VMs) on a single system. Each VM may run simultaneously utilizing the underlying physical hardware resources. Virtual machines allow multiple operating system instances to run on the same processor offering benefits such as system consolidation, legacy migration, activity partitioning and security.

Virtualization architectures typically involve two principal classes of software components: (a) Virtual machine monitors (VMMs) and (b) Virtual Machines (VMs). The VMM software layer runs at the highest privilege level and has complete ownership of the underlying system hardware. The VMM allows the VMs to share the underlying hardware and yet provides isolation between VMs.

The limitations of software-only methods for I/O virtualization can be removed by direct assignment of I/O devices to VMs using the DMA remapping circuit 135. With direct assignment of devices, the driver for an assigned I/O device runs only in the VM to which it is assigned and is allowed to interact directly with the device hardware without trapping to the VMM. The hardware support enables DMA remapping without device specific knowledge in the VMM.

In this model, the VMM restricts itself to a controlling function where it explicitly does the set-up and tear-down of device assignment to VMs. Rather than trapping to the VMM for all guest I/O accesses as in the case of software-only methods for I/O virtualization, the VMM requires the guest I/O access trapping only to protect specific resources such as device configuration space accesses, interrupt management etc., that impact system functionality.

To support direct assignment of I/O devices to VMs, a VMM manages DMA from I/O devices. The VMM may map itself to a domain, and map each VM to an independent domain. The I/O devices can be assigned to domains, and the physical address translation hardware provided by the DMA remapping circuit 135 may be used to allow the DMA from I/O devices only to the physical memory assigned to its parent domain. For VMs that may be relocated in physical memory (i.e., the GPA not identical to the HPA), the DMA remapping circuit 135 can be programmed to do the necessary GPA-to-HPA translation.

With hardware support for I/O device assignment, VMM implementations can choose a combination of software-only I/O virtualization methods and direct device assignment for presenting I/O device resources to a VM.

Figure 3:
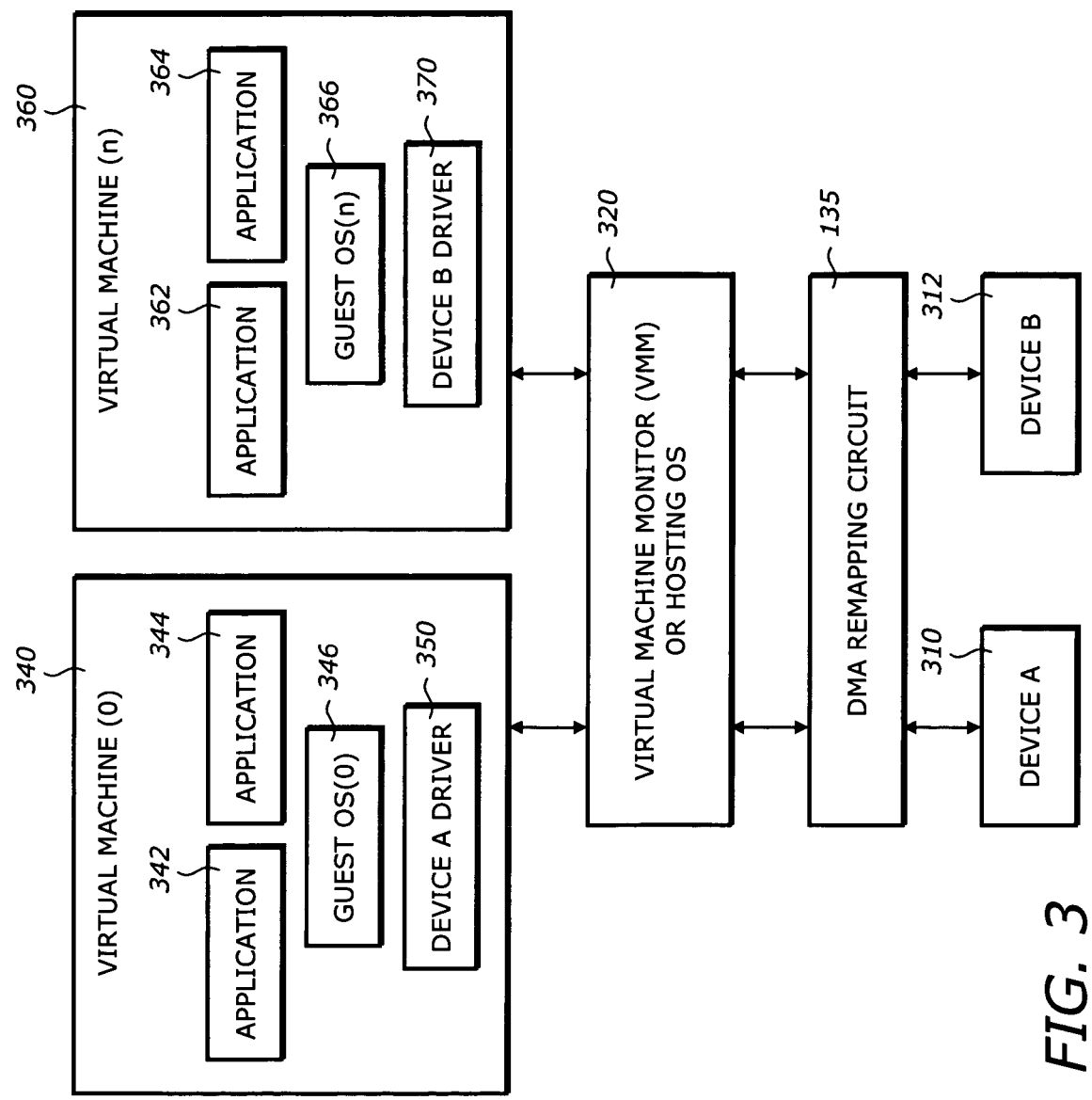
FIG. 3 is a diagram illustrating virtualization using direct memory access (DMA) remapping according to one embodiment of the invention.

FIG. 3 is a diagram illustrating virtualization using direct memory access (DMA) remapping according to one embodiment of the invention. The virtualization includes two devices A and B 310 and 312, the DMA remapping circuit 135, a VMM or hosting OS 320, $VM_0$ 340 and $VM_n$ 360.

The two devices A and B 310 and 312 are two I/O devices that are supported by the two VM 340 and 360, respectively. The DMA remapping circuit 135 directly maps these two devices to the respective VM's 340 and 360 without specific knowledge of the VMM or hosting OS 320.

The VMM or the hosting OS 320 provides support for the underlying hardware of the platform or the system it is running on. The VMs 340 and 360 have similar architectural components but are completely isolated from each other. They are interfaced to the VMM or hosting OS 320 to access to the system hardware. The VM 340 includes applications 342 and 344. More or less applications may be supported. It has a guest OS 346 and a device A driver 350. The device A driver 350 is a driver that drives, controls, interfaces, or supports the device A 310. Similarly, the VM 360 includes applications 362 and 364. More or less applications may be supported. It has a guest OS 366 and a device B driver 370. The guest OS 366 may be the same or different than the guest OS 346 in the VM 340. The device B driver 370 is a driver that drives, controls, interfaces, or supports the device B 312.

In the software-only method without the DMA remapping circuit 135, the device A and B drivers 350 and 370 would reside in the VMM or hosting OS 320. The functionality of these two drivers is therefore limited by the functionality emulated in the VMM. Without DMA remapping support, the VMM has to provide emulation/proxy drivers and the guest OS will use devices drivers specific to the virtual device that the VMM decides to expose. It could be a device unrelated to the real platform device or a device the same as the real platform device. In the latter case, the VMM proxies the real device. In addition, the performance may be limited because the guest I/O operations are trapped by the VMM or hosting OS 320 and proxied or emulated before being submitted to the underlying physical device hardware. Finally, since all or parts of the device A and B drivers 350 and 370 are run as part of the privileged VMM software, the overall robustness of the platform may be compromised, especially when these drivers may generate errors, crashing the VMM or hosting OS 320. With the DMA remapping circuit 135, the device A and B drivers 350 and 370 may interact directly to the respective I/O devices 310 and 312, and therefore avoid all of the above limitations.

The DMA remapping architecture provided by the DMA remapping circuit 135 facilitates the assigning of I/O devices to an arbitrary number of domains. Each domain has a physical address space that may be different than the system physical address space. The DMA remapping provides the transformation of guest physical address (GPA) in DMA requests from an I/O device to the corresponding host physical address (HPA) allocated to its domain.

To support this, the platform may support one or more I/O physical address translation hardware units. Each translation hardware unit supports remapping of the I/O transactions originating from within its hardware scope. For example, a desktop chipset implementation may expose a single DMA remapping hardware unit that translates all I/O transactions at the memory controller hub (MCH) component. A server platform with one ore more core chipset components may support independent translation hardware units in each component, each translating DMA requests originating within its I/O hierarchy. The architecture supports configurations where these hardware units may share the same translation data structures in system memory or use independent structures depending on software programming.

The chipset DMA remapping circuit 135 treats the address in a DMA requests as a guest physical address (GPA). The DMA remapping circuit 135 may apply the address translation function to the incoming address to convert it to a host physical address (HPA) before further hardware processing, such as snooping of processor caches or forwarding to the memory controller.

In a virtualization context, the address translation function implemented by the DMA remapping circuit 135 depends on the physical-memory management supported by the VMM. For example, in usages where the software does host physical memory allocations as contiguous regions, the DMA translation for converting GPA to HPA may be a simple offset addition. In usages where the VMM manages physical memory at page granularity, the DMA remapping circuit 135 may use a memory-resident address translation data structure.

Figure 4:
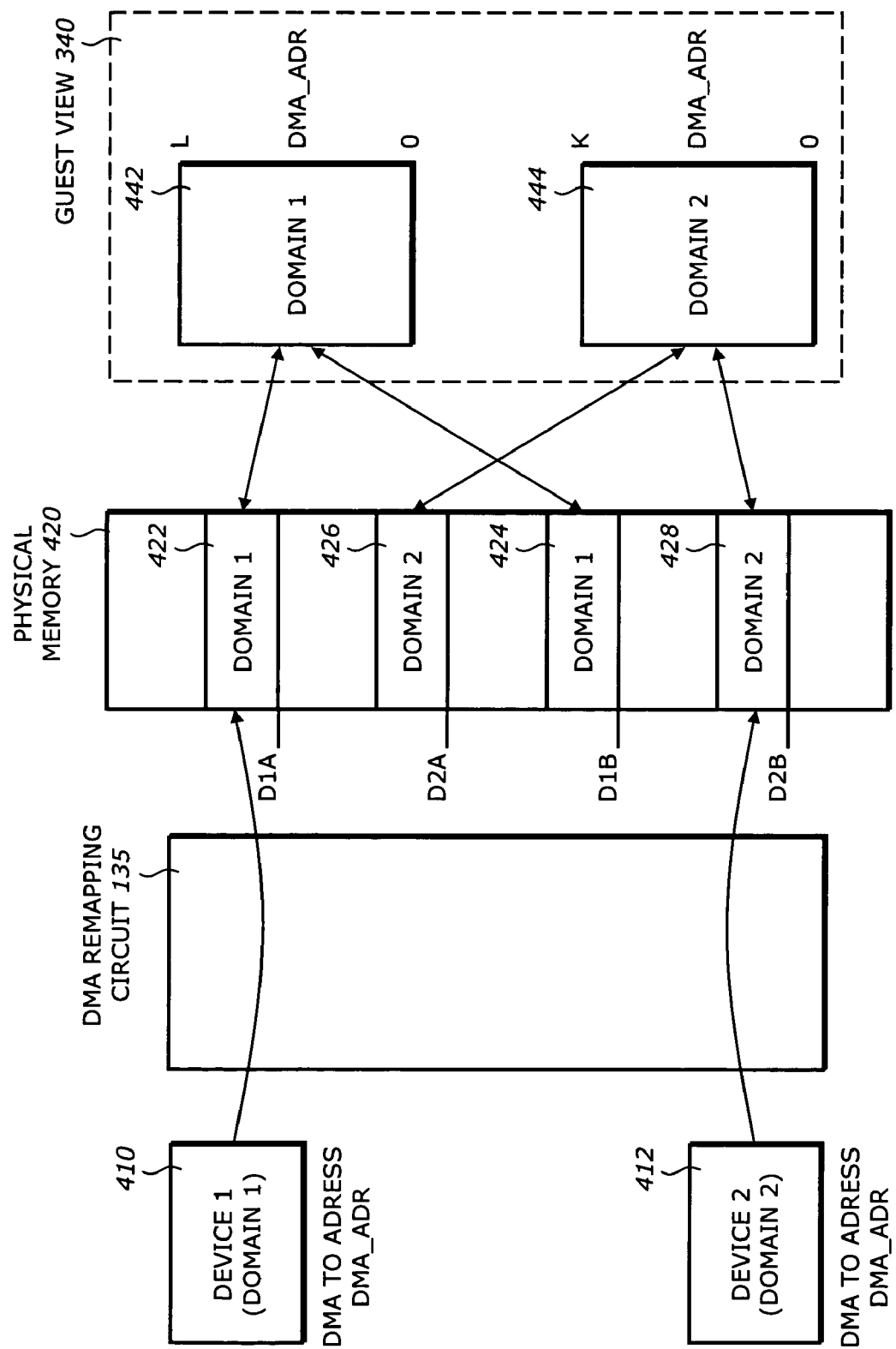
FIG. 4 is a diagram illustrating an I/O address translation according to one embodiment of the invention.

FIG. 4 is a diagram illustrating an I/O address translation according to one embodiment of the invention. The I/O address translation includes two I/O devices 1 and 2 410 and 412, the DMA remapping circuit 135, a physical memory 420, and a guest view 440.

The I/O devices 1 and 2 410 and 412 are assigned to two separate domains. They perform I/O requests or DMA requests to addresses DMA_ADR. The DMA remapping circuit 135 maps these two devices to corresponding domains allocated in the physical memory 420. The physical memory 420 allocates domains 1 422 and 424 and domains 2 426 and 428. More or less allocated memory sections may be allocated for these devices. The domains 1 422 and 424 correspond to device 1 410 and the domains 2 424 and 428 correspond to device 1 412. In the example illustrated in FIG. 4, device 1 410 is mapped to the domain 1 422 and the device 2 412 is mapped or assigned to the domain 2 428.

The guest view 440 is a logical view from the guest I/O devices. It includes domains 1 442 and 2 444. The domain 1 442 corresponds to the two domains 1 422 and 424 in the physical memory 420. The domain 2 444 corresponds to the two domains 2 426 and 428. From the guest view 440, there is only one domain corresponding to one I/O device. The DMA_ADR address from the device 1 410 is mapped to the DMA_ADR1 located within the address space from 0 to L of the domain 1 442. Similarly, the DMA_ADR address from the device 2 412 is mapped to the DMA_ADR2 located within the address space from 0 to K of the domain 2 444.

The software responsible for the creation and management of the domains allocates the physical memory 420 for both domains and sets up the GPA-to-HPA address translation function in the DMA remapping circuit 135. The DMA remapping circuit 135 translates the GPA generated by the devices 410 and 412 to the appropriate HPA's.

Figure 5:
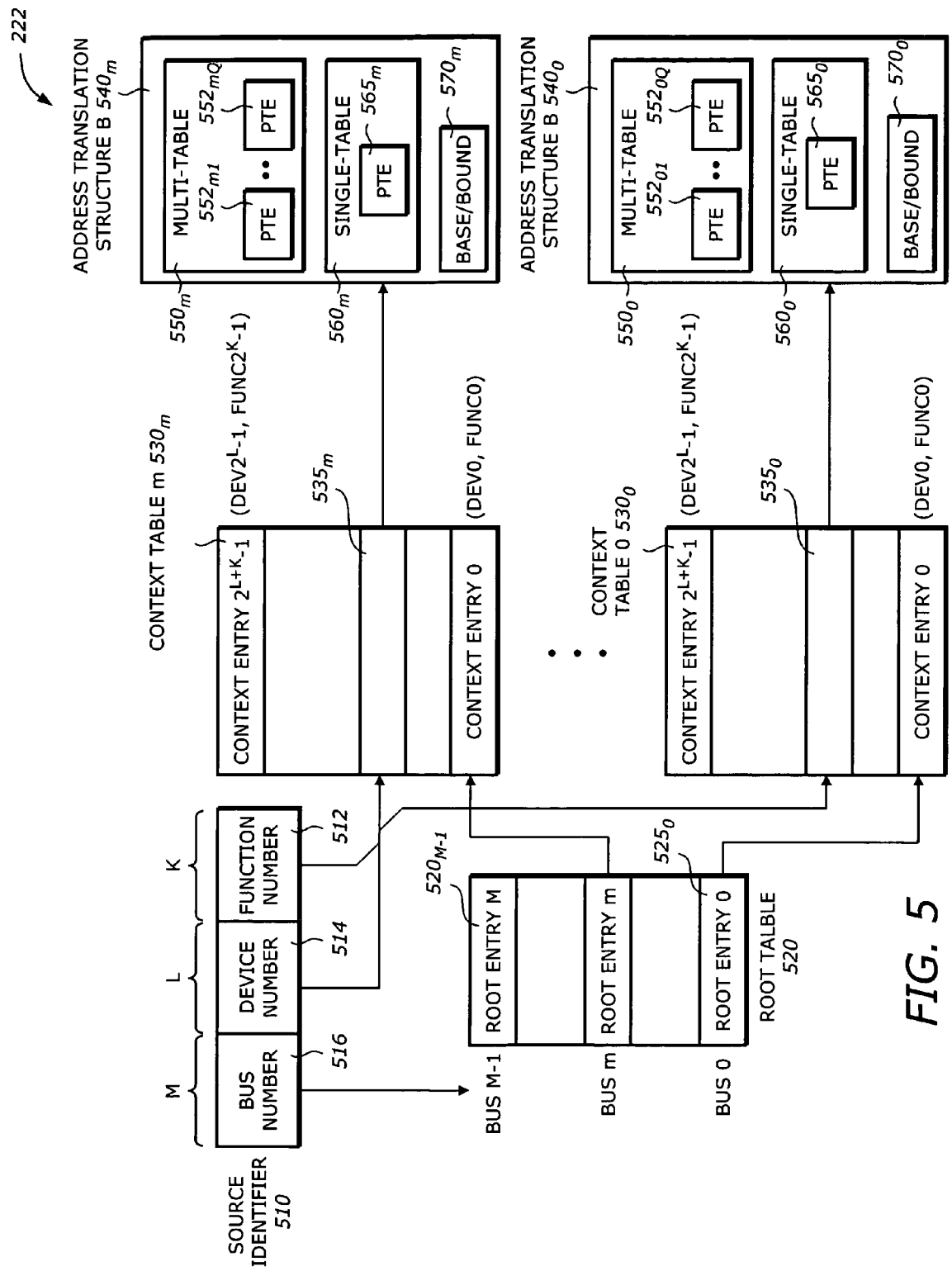
FIG. 5 is a diagram illustrating a DMA remapping structure according to one embodiment of the invention.

FIG. 5 is a diagram illustrating a DMA remapping structure 222 according to one embodiment of the invention. The DMA remapping structure 222 receives a source identifier 510 and includes a root table 520, a number of context tables $530_0$ to $530_U$, and a number of address translation structures $540_0$ to $540_V$. The remapping structure 222 receives the source identifier 510 and a guest physical address from the I/O device, and translates the guest physical device to a host physical device in an assigned domain. The translation may be performed using translation tables arranged in a hierarchical manner. The translation mechanism starts from the root table 520 and traverses, or walks, through the context tables $530_0$ to $530_U$ and the address translation structures $540_0$ to $540_V$.

The requestor identity of the I/O transactions appearing at the DMA remapping circuit 135 determines the originating device and the domain that the originating I/O device is assigned to. The source identifier 510 is the attribute identifying the originator of an I/O transaction. The DMA remapping circuit 135 may determine the source identifier 510 of a transaction in implementation specific ways. For example, some I/O bus protocols may provide the originating device identity as part of each I/O transaction. In other cases, such as for chipset integrated devices, the source identifier 510 may be implied based on the chipset's internal implementation.

For PCI Express devices the source identifier 510 is mapped to the requester identifier provided as part of the I/O transaction header. The requester identifier of a device is composed of its PCI Bus/Device/Function numbers assigned by the configuration software and uniquely identifies the hardware function that initiates the I/O request. In one embodiment, the source identifier 510 includes a function number 512, a device number 514, and a bus number 516. In the example illustrated in FIG. 5, the function number 512 is K-bit wide, the device number 514 is L-bit wide, and the bus number 516 is M-bit wide. The bus number 516 identifies the bus on which the I/O transaction is generated. The device number 514 identifies the specific device on the identified bus. The function number 512 identifies the specific function requested by the I/O device. The source identifier 510 is used to index or look up the root table 520 and the context tables $530_0$ to $530_U$. In the example illustrated in FIG. 5, there are two I/O transactions using bus 0 and bus m.

For PCI Express devices, the root table 520 stores root entries $525_0$ to $525_{M-1}$ indexed by the source identifier 510, or the bus number 516 of the source identifier 510. The root entries function as the top level structure to map devices on a specific bus to its respective parent domain. The root entry 0 $525_0$ corresponds to the I/O transaction using bus 0. The root entry m $520_m$ corresponds to the I/O transaction using bus m. The root entries 0 $525_0$ and $525_m$ point to the context table $530_0$ and $530_m$, respectively. In one embodiment, these entries provide the base address for the corresponding context table.

The context tables $530_0$ to $530_U$ store context entries $535_k$'s referenced by the root entries. The context entries $535_k$'s map the I/O devices to their corresponding domain(s). The device number 514 and the function number 512 are used to obtain the context entry corresponding to the I/O transaction. In one embodiment, they form an index to point to, or reference, the context table referenced by the corresponding root entry. There are $2^M*2^L*2^K$ or $2^{M+L+K}$ context entries. In one embodiment, K=3, L=5, and M=8, resulting in a total of 64K entries, organized as $2^M$ ($2^8$=256) context-entry tables. In the example shown in FIG. 4, the two context entries for the two I/O transactions are the context entry $535_0$ in the context table $530_0$ and the context entry $535_m$ in the context table $530_m$. The context entries $535_0$ and $535_m$ point to the address translation structures $540_0$ and $540_m$, respectively.

The address translation structures $540_0$ to $540_V$ provide the address translation to the host physical address using the guest physical address corresponding to the I/O transaction. Each of the address translation structures $540_0$ to $540_V$ may be a multi-table 550, a single table 560, or a base/bound 570 corresponding to the three translation mechanisms using multi tables, single table, and base/bound translations, respectively. In the following description, a regular page size of 4 KB is used. As is known by one skilled in the art, any other sizes may also be used.

To provide software flexible control of the DMA remapping circuit 135, the DMA remapping circuit 135 has a number of registers contained in the register set 220 shown in FIG. 2. The register set 220 is located in the host physical address space through a Base Address (BAR) register. The translation hardware BAR register is exposed to software in an implementation dependent manner. This may be exposed as a PCI configuration space register in one of the chipset integrated devices, such as the memory controller device. In one embodiment, the BAR register provides a minimum of 4K address window. A register in the register set 220 may have a number of fields. A field may be asserted or negated. When a field consists of only a single bit, assertion implies that the bit is set to a defined logical state (e.g., TRUE, logical one) and negation implies that the bit is reset to a defined logic state that is complementary to the state of the assertion (e.g., FALSE, logical zero). In the following, the use of an asserted or negated state is arbitrary. A field may be asserted to indicate a first state and negated to indicate a second state, or vice versa.

A field in a register may be programmed, initialized, or configured by the DMA remapping circuit 135 and/or by the software. It may also correspond to a specialized hardware circuit or a functionality implemented by a data structure, a function, a routine, or a method. In the following, field are grouped into registers. The grouping, formatting, or organization of these fields or bits in the following registers is for illustrative purposes. Other ways of grouping, formatting, or organizing these fields may be used. A field may also be duplicated in more than one registers. A register may have more or less than the fields as described. In addition, registers may be implemented in a number of ways, including as storage elements or memory elements.

Figure 6:
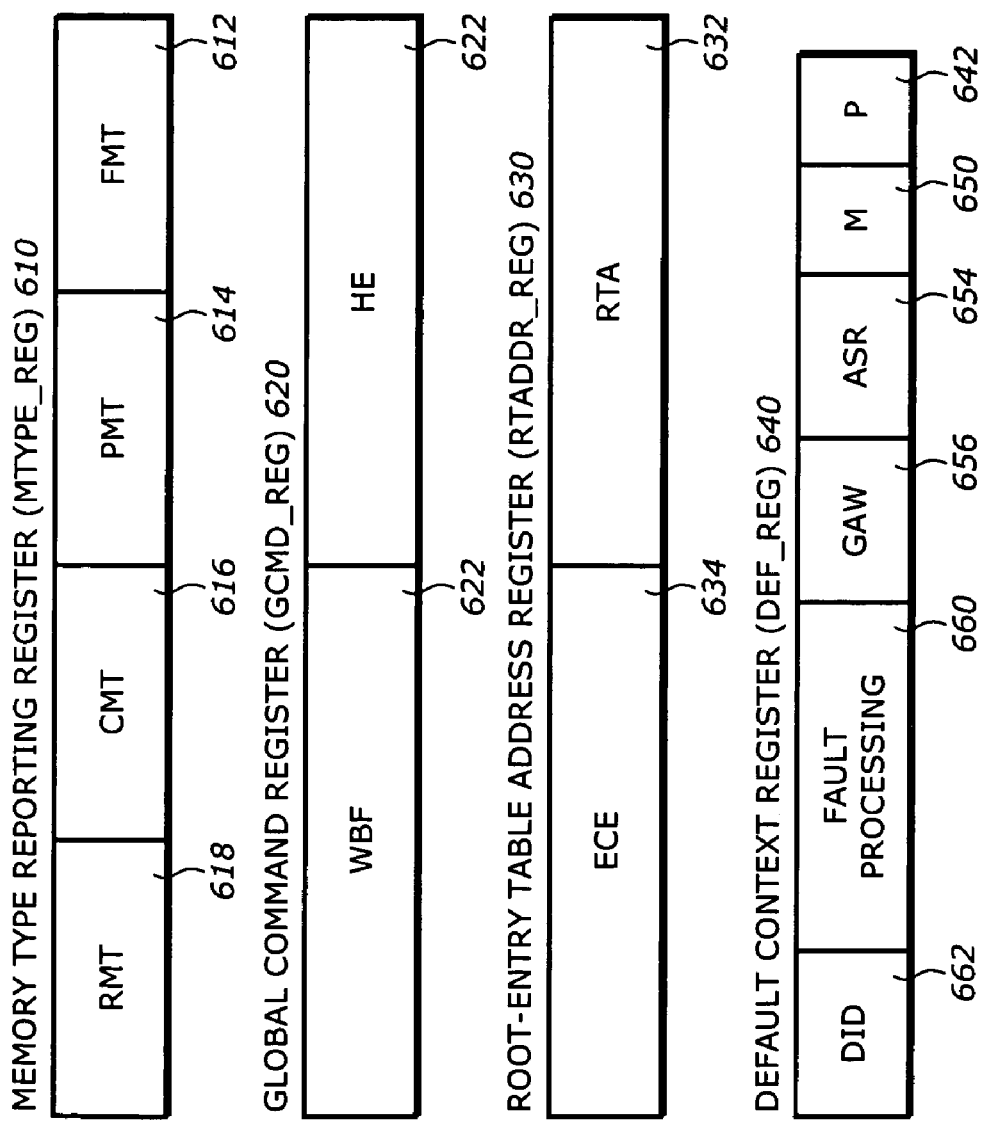
FIG. 6 is a diagram illustrating a register set containing common registers according to one embodiment of the invention.

FIG. 6 is a diagram illustrating a register set containing common registers according to one embodiment of the invention. The common registers include a memory type reporting register (MTYPE_REG) 610, a global command register (GCMD_REG) 620, a root entry table address register (RTADDR_REG) 630, and a default context register (DEF_REG) 640.

The MTYPE_REG 610 reports memory types of translation data structures. It includes a fault log memory type (FMT) field 612, a page table memory type (PMT) field 614, a context entry table memory type (CMT) field 616, and a root entry table memory type (RMT) field 618.

The FMT field 612 indicates whether the fault log region is cacheable. When negated, it indicates that the fault log region may be uncached. When asserted, it indicates that the fault log region may be in a cacheable region. The PMT field 614 indicates whether the page tables are cacheable. When negated, it indicates page tables may be in an uncached memory region. When asserted, it indicates that the page tables may be in a cacheable region. The CMT field 616 indicates whether the context tables are cacheable. When negated, it indicates context tables may be in an uncached memory region indicates context tables may be in a cacheable region. The RMT field 618 indicates whether the root table is cacheable. When negated, it indicates root table may be in an uncached memory region. When asserted, it indicates that root table may be in a cacheable region.

The GCMD_REG 620 controls the translation behavior. It includes a translation hardware enable (HE) field 622 and a write buffer flush (WBF) field 624.

The HE field 622 is a software programmable control field to enable or disable the translation hardware. When negated, it indicates to disable the translation hardware. When asserted, it indicates to enable translation hardware. When updating this field, the software should read back and check this field to confirm the enable/disable status.

The WBF field 624 is used to flush the chipset internal write buffers. This is done to ensure any updates to context table or page tables are not held in any internal write posting buffers. The software asserts this field to issue the write buffer flush command. The logic circuit 224 negates it to provide an indication of the write buffer flush completion. The software should read back and check the field to be negated to confirm the flush completion.

The RTADDR_REG 630 sets up the base address of memory resident root table. The software should program this register by writing to the lower double word (DWORD) last. It includes a root table base address (RTA) field 632 and an enable context entries (ECE) field 634. The RTA field 632 points to base of page aligned, regular-sized root table in system memory. A regular size may be any convenient pre-defined size. In one embodiment, the regular size is 4 KB. The DMA remapping circuit 135 may implement only the least significant N bits where N is the (host address width—12). The rest of the field may be treated as read only. The ECE field 634 is a control field to enable or disable the use of the context entries. This does not affect the use of the default context. When negated, it indicates disabling use of the context entry. DMA requests are processed based on programming of default register. When asserted, it indicates enabling use of the context entry to process DMA requests. The root and context tables are setup in memory and the base of root table is provided in the upper bits (e.g., bits 12 through 63).

The DEF_REG 640 specifies the default context. Each context entry in the context tables specifies how to manage DMA requests from a specific device. The default context represents a default domain to which devices managed by the DMA remapping circuit 135 are initially assigned until the software programs the device to domain mapping tables and enables the look-up of these tables. For example, upon hot-plug of an I/O device into the system, if a context for this device is not pre-programmed by software, the device is assigned to the default domain until software explicitly assigns it to another domain. The default context is programmed through the DEF_REG 640.

The translation hardware checks the source identifier in the DMA requests as follows. If the context entries are enabled (e.g., through a global command register), the source identifier in the incoming DMA request is used to lookup its corresponding root entry and, through the root entry, the context entry. In this case, the DMA is processed according to the programming of the root and context entries. If the context entries are not enabled, the DMA request is processed according to the DEF_REG 640.

Similar to other context entries, the default context can be programmed to enforce specific types of translation functions, such as blocking, pass through, address filtered, address translated using a translation structure, etc.

The DEF_REG 640 includes a present (P) field 642, a single/multi-level table (M) field 650, an address space root (ASR) field 654, a guest address width (GAW) field 656, a fault processing field 660, and a domain identifier (DID) field 662. Typically, the P field 642 and the M field 650 are one-bit indicators.

The P field 642 should be always checked when processing transactions. When negated, it indicates all transactions through this context entry is blocked. When asserted, it indicates process transactions through this context entry based on programming of other fields.

The M field 650 is used to indicate whether multi-level table translation is used. When asserted, it indicates that a single-level page table used for this context entry bits should be used to index the entries in the page table. When negated, it indicates a multi-level page table used for this context entry should be used to lookup the entries in the root table.

The ASR field 654 is a size-aligned host physical address of address space root. When using a contiguous address space, this field contains the base address of the domain's physical address space. When using page tables (single-level or multi-level), this field points to the base of root table.

The GAW field 656 is valid only for context entries specifying single or multi-level page tables. When using multi-level page tables, this field indicates the adjusted guest address width (AGAW) to be used by the DMA remapping circuit 135 for the page table walk. The value specified in this field is an AGAW value supported by the DMA remapping circuit 135 and reported in a capability register. The capability register is a register that indicates the capability supported by the DMA remapping circuit 135. When using single-level page tables, this field indicates the domain's guest address width. The value specified in this field is between the minimum GAW for single-level page tables and the MGAW value reported by the DMA remapping circuit 135 in the capability register.

If the DMA remapping circuit 135 detects a value in this field that is not supported by the underlying implementation, all DMA requests through this context entry are blocked and a translation fault results. Any DMA request processed through this context entry and accessing guest physical address above $2^{GAW}-1$ (where GAW is the value in this field) is blocked and results in a translation fault.

The FP field 660 enables or disables recording of faults by DMA requests processed through this context entry.

The DID field 662 indicates the domain identifier for the default domain.

Address Filtering:

The multi-level page table structure-based address translation provides the most flexibility by allowing the software to manage the memory at a regular (e.g., 4 KB) page granularity. However, the multi-level page-table structure incurs the most address translation latency since it requires the hardware to walk the page tables. Even though hardware implementations may utilize translation caches to reduce the translation overheads, the page walk latencies incurred on I/O Translation Lookaside Bus (TLB) misses may be unsuitable for certain types of I/O traffic. For example, DMA requests from PCI-Express devices, such as high-definition audio, using isochronous channels, and certain chipset integrated devices such as integrated graphics cannot incur the non-deterministic DMA remapping latencies.

For hardware implementations supporting I/O devices that may be negatively impacted by the DMA remapping latencies, the architecture defines assignment of devices to a non-relocated domain through DMA address filtering (instead of address translation). A non-relocated domain is a domain whose guest physical address space is a subset of the system's host physical address space. The address filtering hardware preserves the software flexibility to manage host memory in regular-sized (e.g., 4 KB) pages, and incurs only minimum overhead.

Support for address filtering is reported by the DMA remapping circuit 135 through the capability register in the register set 220. Hardware implementations, such as those not supporting isochronous channels, that are capable of address translating DMA requests from all devices are not required to support address filtering. If a platform configuration requires multiple DMA remapping hardware units such as one per chipset component or PCI-Express root port, and if address filtering support is required by one of the units, then it is supported by all the hardware units.

Figure 7:
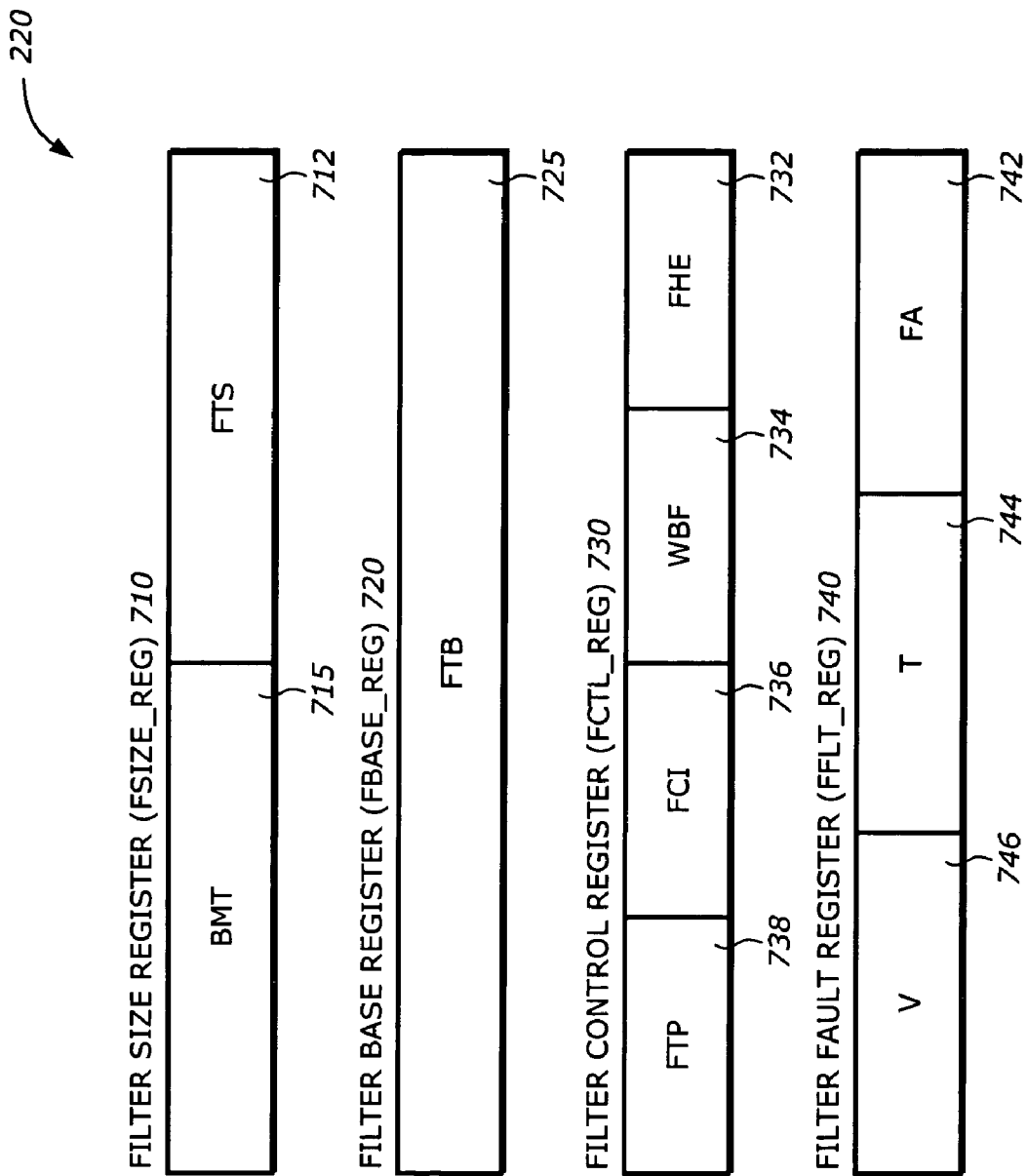
FIG. 7 is a diagram illustrating a register set containing address filtering registers according to one embodiment of the invention.

For address filtering, the pages in the memory allocated to the non-relocated domain are indicated through a memory-resident table referred as the Filter Bitmap Table as shown in FIG. 7. The architecture supports only a single non-relocated domain, and hence, a single filter bitmap table pointer per reported DMA-remapping hardware. The location and size of the filter bitmap table is programmed through the address filter base and size registers as shown in FIG. 7. The size of the bitmap table is computed as ($4\ KB * 2^S$), where S is the value programmed to the address filter size register. Each bit in the table represents a 4K host page, with the first bit representing the first 4K host physical address space. The minimum size of the filter bitmap table is 4 KB, which maps the first 128 MB region of the host memory.

Devices whose DMA requests can only be address filtered by hardware are reported by the platform firmware to software. Any programming of the context entries for these devices should ensure it is setup to address filter, and not to block, to allow as pass-through, or to address translate the DMA requests.

The I/O devices whose DMA requests can also be address translated or address filtered may be assigned to the non-relocated domain by programming the corresponding context entries to indicate address filtering. Similarly, the non-relocated domain could be made the same as the default domain by programming the default context register to indicate address filtering.

If a context entry is programmed to indicate address filtering, the rest of the context entry fields (other than Valid, Present and Pass-through fields) is ignored by the DMA remapping circuit 135.

The DMA requests processed through the context entries specifying address filtering are handled by the DMA remapping circuit 135 as follows:

1. The DMA request is validated to ensure it is accessing memory through the normal chipset DMA address decoding logic. If the DMA request is decoded as peer-to-peer, the DMA request is blocked.
2. If the DMA request is to memory, the memory location targeted by the DMA request is validated to be within a 4K page.
3. If the above two checks pass, the GPA in the DMA request is validated to be within the non-relocated domain's address space. Any DMA request attempting to access memory locations above address ($2^{(P+27)}-1$) is blocked, where P is the value programmed in the filter bitmap size register.
4. If all of the above checks pass, the DMA remapping circuit 135 looks up the bit field corresponding to the page accessed by the DMA request at bit offset [GPA>>12] in the filter bitmap table). If the bit is clear, the DMA request is processed as normal. If the bit is set, the DMA request is blocked.

FIG. 7 is a diagram illustrating the register set 220 containing address filtering registers according to one embodiment of the invention. The register set 220 includes a filter size register (FSIZE_REG) 710, a filter base register (FBASE_REG) 720, a filter control register (FCTL_REG) 730, and a filter fault register (FFLT_REG) 740.

The FSIZE_REG 710 indicates the size of the address filtering bitmap table. If the DMA remapping circuit 135 does not support address filtering, this register is treated as reserved (e.g., writes are ignored, and reads return 0). It includes a filter table size (FTS) field 712 and a filter bitmap memory type (BMT) field 715. The BMT field 715 indicates whether the bitmap region is cacheable. When negated, it indicates the bitmap region is uncached. Writes to this field are ignored. When asserted, it indicates the bitmap region may be in a cacheable region. The FTS field 712 indicates size of the address-filter table. The size is computed by the following formula. TableSize=$4K * 2^{FSIZE\_REG}$ bytes. For example, 000 h: 4 KB table supporting 128 MB memory, 0001 h: 8 KB table supporting 256 MB main memory, 0005 h: 128 KB table supporting 4 GB main memory, etc.

The FBASE_REG 720 holds the pointer to the base address of the address filtering bitmap table. If the DMA remapping circuit 135 does not support address filtering, this register is treated as reserved (e.g., writes are ignored, and reads return 0). It includes a filter table base (FTB) field 725. The FTB field 725 is a pointer to the base address of address filter table in the memory. The table is size-aligned. The smallest table size is 128K supporting 4 GB addressability.

The FCTL_REG 730 controls caching of the address filter bitmap table. If the DMA remapping circuit 135 does not support address filtering, this register is treated as reserved (e.g., writes are ignored, and reads return 0). It includes a filter hardware enable (FHE) field 732, a write buffer flush (WBF) field 734, a filter cache invalidate (FCI) field 736, and a filter table protect (FTP) field 738. The FHE field 732 is a software programmable control field to enable or disable the address-filtering hardware. When negated, it indicates disabling the address filtering hardware. Any DMA request that is otherwise address filtered is processed as pass through. When asserted, it indicates enabling the address filtering hardware. The filter base and size registers are programmed before enabling address filtering hardware through this field. The WBF field 734 is used to flush the chipset internal write buffers. This is done to ensure filter bitmap table updates are not held in any internal write posting buffers. The software asserts this field to issue the write buffer flush command. The DMA remapping circuit 135 negates it to provide indication of write buffer flush completion. The software should read back and check the field to be negated to confirm flush complete. The FCI field 736 invalidates address filter bitmap cache. The software asserts this field to request address filter cache invalidation. The DMA remapping circuit 135 negates it to indicate invalidation completion. The software should read back and check this field to be negated to confirm invalidation completion. The FTP field 738 indicates protecting the address filter bitmap region. When it is asserted by software, the hardware starts protecting the address filter bitmap region from DMA accesses. The software should read this field and check it to be asserted to confirm that the address filter bitmap region is protected. When it is negated by software, the DMA remapping circuit 135 stops protecting the address filter bitmap region from DMA accesses.

The FFLT_REG reports faults detected by address filtering hardware. If the DMA remapping circuit 135 does not support address filtering, this register is treated as reserved (e.g., writes are ignored, and reads return 0). It includes a Faulting Address (FA) field 742, a Type (T) field 744, and a Valid (V) field 746. The FA field 742 is a frame address of the location accessed by the faulting DMA request. The T field 744 indicates the memory access type of faulted DMA request. When negated, it indicates DMA Write. When asserted, it indicates DMA Read request. The V field 746 indicates if the page frame address of the faulting DMA request is latched. When it is asserted, the page frame address of the faulting DMA request is latched in the faulting address field and no further address filtering fault addresses are latched. The software should explicitly negate this field through writes to re-enable address filtering fault recording.

Figure 8A:
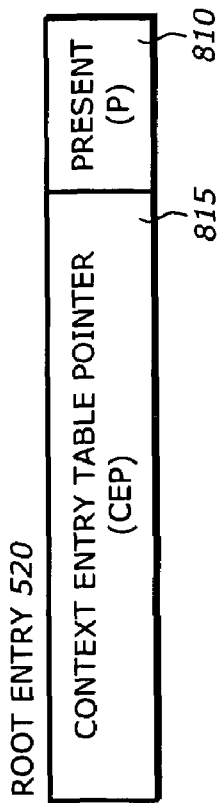
FIG. 8A is a diagram illustrating a root entry according to one embodiment of the invention.

FIG. 8A is a diagram illustrating the root entry 520 according to one embodiment of the invention. The root entry 520 includes a present (P) field 810 and a context entry table pointer (CEP) field 815.

The P field 810 indicates if the root entry is present. When negated, it indicates that the root entry is not present and should not be used. The DMA remapping circuit 135 faults the DMA request processed through this root entry. When asserted, it indicates that the root entry is present and can be used to process the transaction.

The CEP field 815 is a pointer to the context table for this bus. The context table is 4 KB in size and page aligned.

Figure 8B:
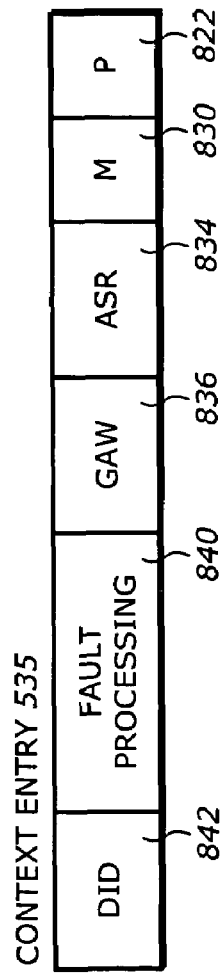
FIG. 8B is a diagram illustrating a context entry according to one embodiment of the invention.

FIG. 8B is a diagram illustrating the context entry 535 according to one embodiment of the invention. The context entry 535 includes a Present (P) field 822, a Multi-level (M) field 830, an Address Space Root (ASR) field 834, a Guest Address Width (GAW) field 836, a Fault Processing (FP) field 840, and a Domain Identifier (DID) field 842. The context entry 535 has fields that are similar to the default register DEF_REG 640 shown in FIG. 6. Typically, the P field 822 and the M field 830 are one-bit indicators.

The P field 822, the M field 830, the ASR field 834, and the GAW filed 836 are similar, respectively, to the P field 642, the M field 650, the ASR field 654, and the GAW field 656 in the default register (DEF_REG 640) shown in FIG. 6.

The DID field 842 is an identifier for the domain to which this context entry belongs to. The software should ensure that all devices use the same page table structures, and hence have addresses translated identically, have the same domain identifier in their context entries. The DMA remapping circuit 135 may use the domain identifier for tagging its cached entries when cache support is used.

Figure 8C:
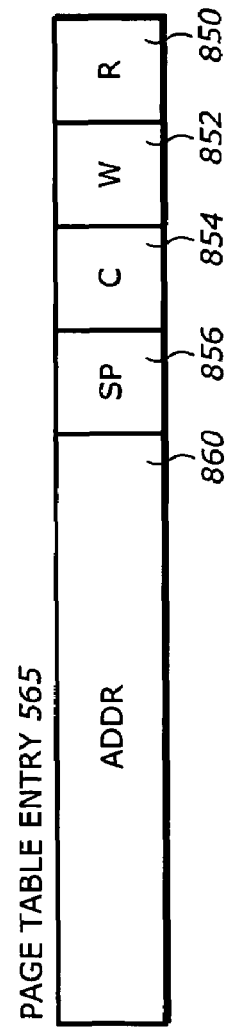
FIG. 8C is a diagram illustrating a page table entry according to one embodiment of the invention.

FIG. 8C is a diagram illustrating a page table entry (PTE) 565 according to one embodiment of the invention. The PTE 565 includes a Readable (R) field 850, a Writable (W) field 852, a Coherent (C) field 854, a Super page (SP) field 856, and an address (ADDR) field 860. Note that more or less fields than these fields may be defined.

The R field 850 indicates if a page is readable for DMA. When negated, it indicates the page is not accessible to DMA read requests. DMA read requests processed through this page table entry are blocked. If fault reporting is enabled, a translation fault is generated. When asserted, it indicates the page is accessible to DMA read requests.

The W field 852 indicates if page is writable for DMA. When negated, it indicates the page is not accessible to DMA write requests. DMA write requests processed through this page-table entry are blocked. If fault reporting is enabled, a translation fault is generated. When asserted, it indicates the page is accessible to DMA write requests.

The C field 854 specifies if the access to the translated host physical address is coherent or not. When negated, it indicates that the DMA access to the translated host physical address follows the coherency attribute specified in the I/O transaction. For example, PCI-X or PCI-Express requests with "no-snoop" attribute set access the translated host physical address without being snooped. When asserted, it indicates that DMA access to the translated host physical address is processed as coherent. The software should make sure this field is treated as reserved (0) when: In all page table entries, if the DMA remapping circuit 135 does not support the asserted setting of the C field (as reported in the capability register), and in non-leaf page-table entries with SP field being negated.

The SP field 854 indicates to the DMA remapping circuit 135 that this is a leaf page table entry and complete page walk. When negated, it indicates continuing with the page walk and using the next level table. When asserted, it indicates stopping the table walk and forming the host physical address using the unused lower bits in the guest physical address for the page walk along with the upper bits of the page base address provided in the ADDR field 860. The DMA remapping circuit 135 evaluates the SP field 854 only in the page table entries corresponding to the super-page sizes it supports as reported in the capability register. The software should treat this field as reserved (e.g., 0) in: (1) 4 KB leaf page table entries in multi-level page tables, (2) non-leaf page table entries in multi-level page tables corresponding to super-page sizes not supported by the DMA remapping circuit 135, and (3) page table entries in single level page tables.

The ADDR field 860 contains the Host Physical Address of the page frame if this is a leaf node. Otherwise it contains the pointer to the next level page table. This field is size-aligned.

Note that additional fields may be defined to further characterize the attributes of the address translation mechanism. For example, the following attributes may be defined: a base/bound attribute to enable base/bounds translation, a stride attribute to indicate size of a first level page table in the multi-level table translation, and a pass through attribute to indicate if the I/O transaction is allowed to pass through without translation.

Address Translation Mechanisms:

To support varying granularity of the physical memory management support by software, the DMA remapping architecture defines three types of address translation structures. A chipset implementation may support one or more of these translation structures and report the supported types through its capability register. These mechanisms offer varying cost, complexity, and performance trade-offs. For implementations supporting multiple translation structures, each context entry may be programmed to use different translation structure types.

The following address translation structures are defined: (1) Multi-level page table structure to enable page-granular allocation of regions through multiple levels of page-sized page-tables, each within page-sized regions; (2) Single level page table structure to enable page-granular allocation of regions through a single contiguous page table and (3) Base/Bounds translation structure to enable a contiguous region allocation to domains. Any one of the above translation structures may be selected as default or optional.

Figure 9A:
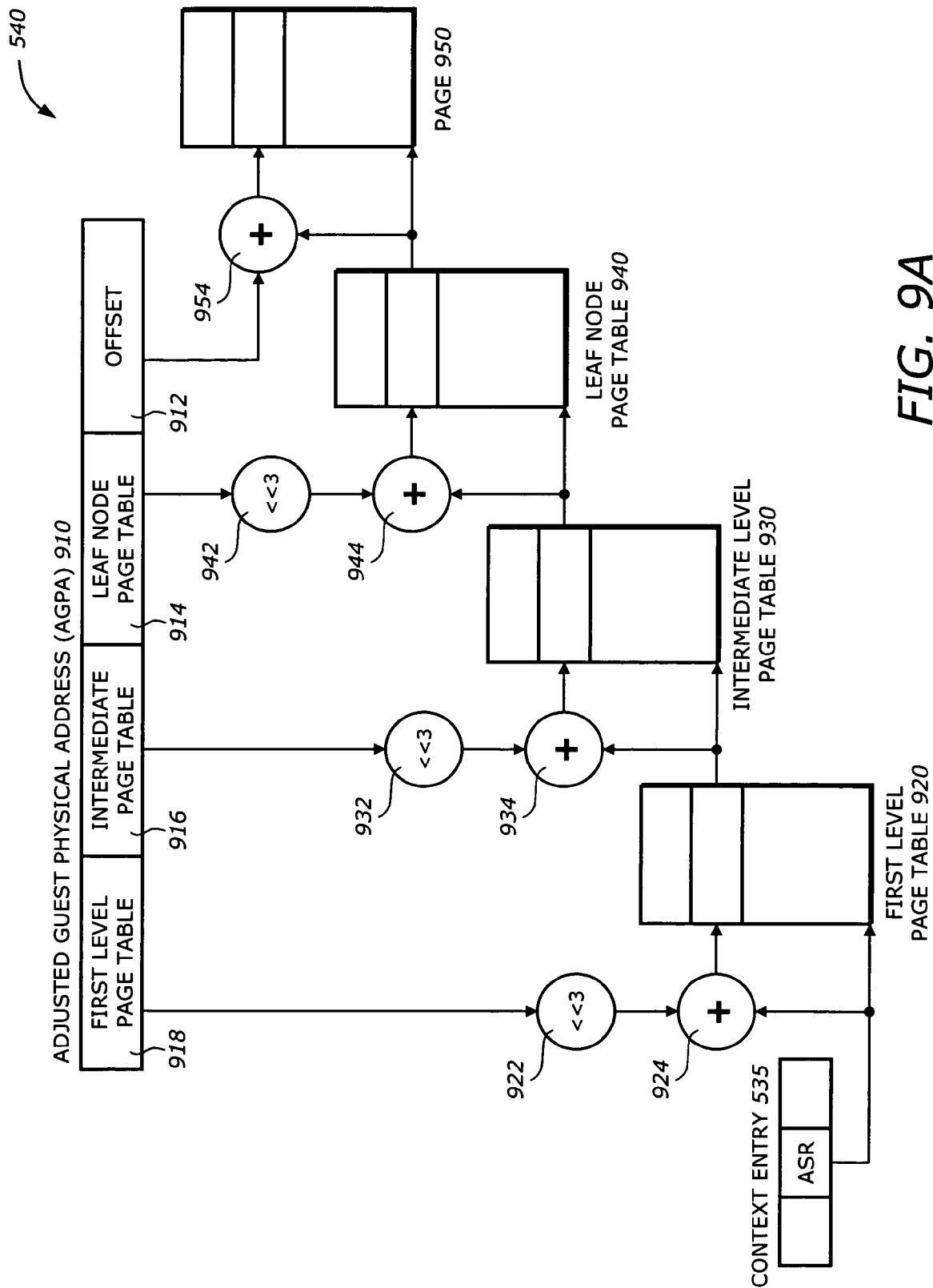
FIG. 9A is a diagram illustrating an address translation structure using multi-level tables according to one embodiment of the invention.

FIG. 9A is a diagram illustrating the address translation structure 540 using multi-level tables according to one embodiment of the invention. The address translation structure 540 includes the context entry 535, an adjusted guest physical address (AGPA) 910, a first level page table 920, an intermediate table 930, a leaf node table 940, and a page 950. The multi-level tables include a number of translation tables arranged in a hierarchical manner.

The ASR field in the context entry 535 provides the base address for the first level page table 920. The AGPA 910 includes an offset field 912, a leaf node page table field 914, an intermediate page table field 916, and a first level page table field 918. It should be noted that the number of levels in the multi-level page tables may be any suitable number depending on the width of the AGPA 910, the memory space, the memory management policy, the word length, and any other implementation factors.

The first level page table field 918 is combined with the first level base address provided by the ASR to index the first level page table 920. In one embodiment, each entry is 8 bytes, the first level page table field 918 is shifted by three bits by a shifter 922 and then added to the first level base address by an adder 924 to provide a first level index to the first level page table 920. The indexed first level page table entry provides the intermediate base address for the intermediate level page table 930.

The intermediate page table field 916 is combined with the intermediate base address to index the intermediate level page table 930. Since each entry is 8 bytes, the intermediate page table field 918 is shifted by three bits by a shifter 932 and then added to the intermediate level base address by an adder 934 to provide an intermediate level index to the intermediate level page table 930. The indexed intermediate level page table entry provides the leaf node base address for the leaf node page table 940.

The leaf node page table field 914 is combined with the leaf node base address to index the leaf node page table 940. Since each entry is 8 bytes, the leaf node page table field 914 is shifted by three bits by a shifter 942 and then added to the leaf node base address by an adder 944 to provide a leaf node index to the leaf node page table 940. The indexed leaf node page table entry provides the host base address for the page 950.

The offset 912 is then combined with the host base address to generate the host physical address in the page 950.

The multi-level page tables allow the software to manage the host physical memory at page (e.g., 4K) granularity and setup a hierarchical structure with page-directories and page-tables. The logic circuit 224 implements the page walk logic and traverses these structures using the GPA provided in the DMA transaction. The maximum number of page-table levels that needs to be traversed to translate a GPA in a DMA request is a function of the guest address width of the corresponding context entry. The software can query the maximum guest address width supported by a given hardware implementation of the DMA remapping circuit 135 through a capability register.

Let P be the regular page size. Let Q be the number of bytes per entry. Let p and q be such that $2^p=P$ and $2^q=Q$. The Adjusted Guest Address Width (AGAW) for a domain is its guest address width (GAW) value adjusted, such that (AGAW−p) is a multiple of (p−q). The AGAW is determined as follows,

```
R = (GAW - p) MOD(p-q);
if (R = = 0) {
    AGAW = GAW;
} else {
    AGAW = GAW + (p-q) - R;
}
```

For example, suppose P=4K and Q=8, then p=12 and q=3. A domain to which 2 GB of memory is allocated has a GAW of 31. The AGAW is computed as:

$R$=(31−12) mod 9=1

AGAW=31+9−1=39

The Adjusted Guest Address Width (AGAW) indicates the number of levels of the page walk. The DMA remapping circuit 135 supports a defined AGAW where the corresponding GAW is equal to the host address width. When using multi-level page tables for a domain, the software computes the Adjusted Guest Address Width (AGAW) as described above. The software uses the AGAW when setting up the multi-level page table structures. It programs the domain's GAW and AGAW in context entries for all devices assigned to this domain.

The DMA remapping circuit 135 may also support smaller adjusted guest address widths. It may report the supported adjusted guest address widths through the capability register. The software should ensure that it uses an AGAW supported by the underlying hardware implementation when setting up multi-level page tables for a domain. The software should also program the domain's AGAW in the context entries for devices assigned to this domain.

The DMA requests processed through context entries specifying multi-level address translations are handled by the DMA remapping circuit 135 as follows:

1. The GPA/Length combination specified in the DMA request is used according to whether the DMA remapping circuit 135 supports page boundary crossing or not. If the DMA remapping circuit 135 supports DMA requests that cross page boundary, and the GPA/Length combination indicates the DMA request crossing page boundary, then each page region targeted by the DMA request is address translated independently. If the DMA remapping circuit 135 does not support DMA requests that cross page boundary, and the GPA/Length combination indicates the DMA request crossing page boundary, then an address translation fault results.

2. If the GAW field programmed in the context entry is not an adjusted guest address width supported by the DMA remapping circuit 135, which is reported in the capability register, then the DMA request is blocked, and an address translation fault results.

3. The GPA in the DMA request is validated to be within the guest physical address space of the domain to which the device is assigned. Any DMA request attempting to access memory locations above address $(2^X-1)$ is blocked, where X is the guest address width programmed in the context entry used to process this DMA request.

4. If the above checks are successful, the GPA in the DMA request is adjusted to X bits, to form an adjust guest physical address (AGPA), where X is the guest address width programmed in the context entry used to process this DMA request. The DMA request to the AGPA is either blocked or translated to a valid HPA according to the programming of the multi-level page table structures.

5. The DMA remapping circuit 135 performs the normal chipset address decoding of the HPA generated by step 4, and processes the DMA request as either an access to memory or a peer-to-peer request.
6. If the translated HPA is decoded to be destined to memory, the HPA is accessed according to support for setting the Coherency (C) attribute. If the DMA remapping circuit 135 supports only the negated setting of the Coherency (C) attribute in the page-table entries, the memory is accessed according to the coherency specified (or inferred from) in the DMA request. For example, if the PCI Express request specified the DMA request as non-snooped, the memory is accessed without being snooped. If the DMA remapping circuit 135 supports the asserted and negated settings of the Coherency (C) attribute in the page-table entries, the memory is accessed according to the programming of the coherency attribute in the leaf page-table entry used to address translate the DMA request.

Figure 9B:
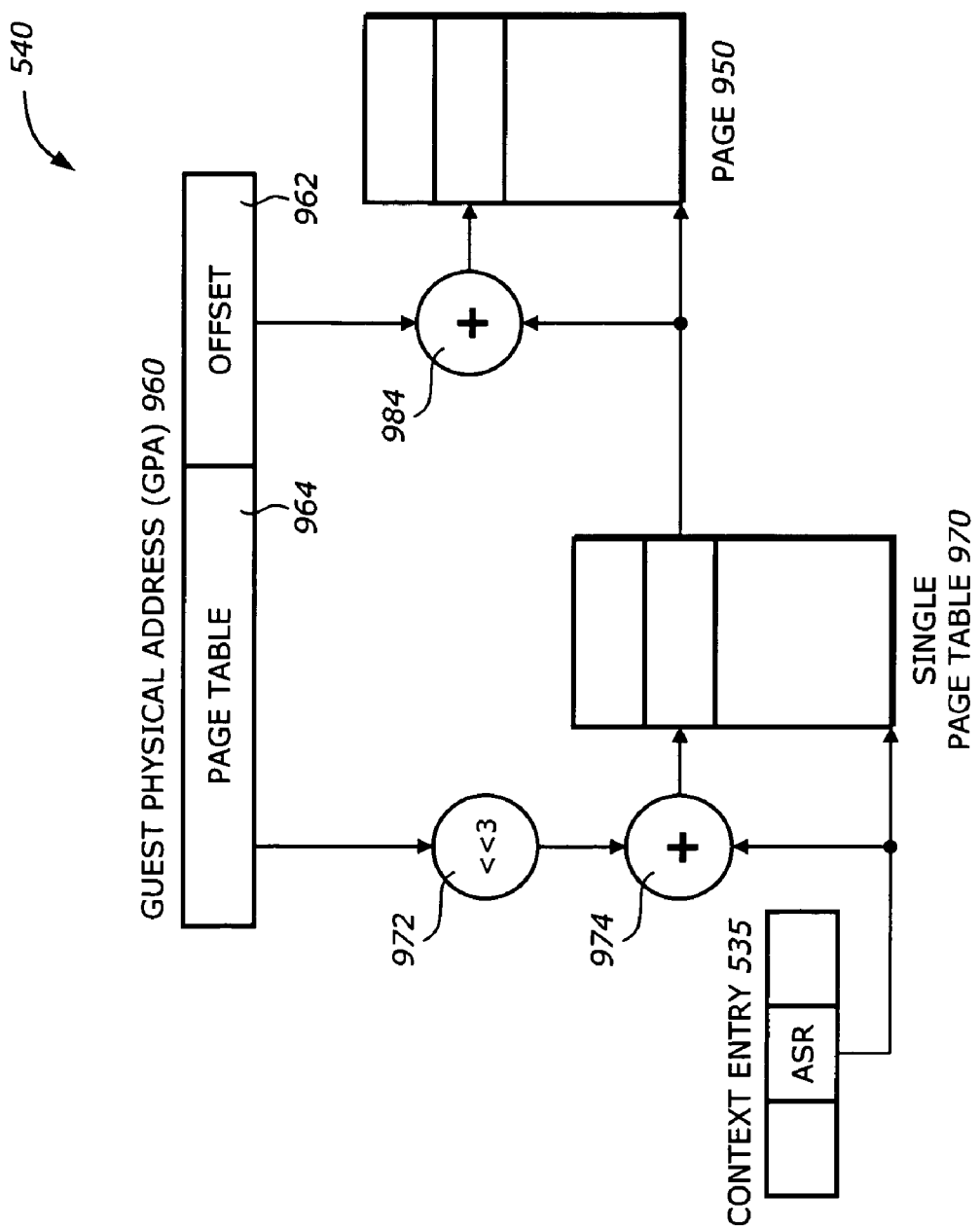
FIG. 9B is a diagram illustrating an address translation structure using a single table according to one embodiment of the invention.

FIG. 9B is a diagram illustrating the address translation structure 540 using a single table according to one embodiment of the invention. The address translation structure 540 includes the context entry 535, a guest physical address (GPA) 960, a single page table 970, and a page 980.

The single level page table offers software an alternative mechanism to provide 4K granular page allocations without long page walks, but at the expense of reserving a large contiguous page-table structure. The page table entry size (e.g., 64 bits) and format for the single level page table are similar to those of the page table entries for the multi-level structure described in previous sections, except that the stride field is treated as reserved.

The size of the page table depends on the size of the guest's address space. For example, for a guest addressability of 1 GB (GAW=30), the software needs to allocate a 2 MB page table, with $2^{18}$ page-table entries. The I/O translation lookaside buffer (TLB) is also applicable to DMA address translations using single-level page table.

The DMA requests processed through context entries specifying single level address translations are handled by the DMA remapping circuit 135 as follows:
1. The GPA/Length combination specified in the DMA request is used according to whether the DMA remapping circuit 135 supports page boundary crossing or not. If the DMA remapping circuit 135 supports DMA requests that cross page boundary, and the GPA/Length combination indicates the DMA request crossing page boundary, each page region targeted by the DMA request is addressed translated independently. If the DMA remapping circuit 135 does not support DMA requests that cross page boundary, and the GPA/Length combination indicates the DMA request crossing page boundary, an address translation fault results.
2. If the GAW field programmed in the context entry is not between a minimum value, e.g., 21, and the maximum guest address width (MGAW) reported by the DMA remapping circuit 135 in the capability register, the DMA request is blocked, and an address translation fault results.
3. The DMA request is validated to be accessing addresses within the guest physical address space of the domain to which the device is assigned. Any DMA request attempting to access memory locations above $(2^x-1)$ is blocked, where X is the guest address width (GAW field) programmed in the context entry used to process this DMA request.
4. If the above checks are successful, the DMA remapping circuit 135 uses bits (X−1):12 to look up the page table entry in the single level page table. The DMA request is either blocked or translated to a valid HPA according to the programming of the page table entry.
5. The DMA remapping circuit 135 performs the normal chipset address decoding of the HPA generated by step 4, and processes the DMA request as either an access to memory or a peer-to-peer request.
6. If the translated HPA is decoded to be destined to memory, the HPA is accessed according to support for setting the Coherency (C) attribute. If the DMA remapping circuit 135 supports only the negated setting of the Coherency (C) attribute in the page table entries, the memory is accessed according to the coherency specified (or inferred from) in the DMA request. For example, if the PCI Express request specified the DMA request as non-snooped, the memory is accessed without being snooped. If the DMA remapping circuit 135 supports the asserted and negated settings of the Coherency (C) attribute in the page table entries, the memory is accessed according to the programming of the coherency attribute in the page table entry used to address translate the DMA request.

The ASR field of the context entry 535 provides the base address to locate the page single table 970. The GPA 960 includes an offset field 962 and a page table field 964. The single page table 970 contains page table entries to point to the page of the host physical address corresponding to the GPA 960.

To look up the corresponding page table entry, the page table field 964 is combined with the base address provided by the ASR field. Since each entry occupies 8 bytes, the page table field 964 is shifted by 3 bits by a shifter 972 and then added to the ASR by an adder 974 to provide the index to the single page table 970.

The page table entry corresponding to the index then provides the base address for the page 980. The offset field 962 is added to this base address by an adder 984 to provide the resulting HPA in the page 980.

FIG. 9C is a diagram illustrating the address translation structure 540 using the base/bound translation according to one embodiment of the invention. The address translation structure 540 includes the context entry 535, a guest physical address (GPA) 960, and a physical memory space 990.

The base-bounds provide the simplest form of address translation where the GPA in the DMA request is used as an offset from the base address for that domain. The base address of the domain is a host physical address and is programmed through the ASR field 834 of the context entry 535 (FIG. 8B). The Guest Address Width (GAW) in the context entry indicates the offset limit. Any DMA request with guest address above the limit indicated by GAW is blocked by the DMA remapping circuit 135.

In one embodiment, the host physical address is 64-bit. For valid guest addresses (e.g., addresses within GAW addressability), the DMA remapping circuit 135 performs the following operations to generate the host physical address:

Host Physical Address [63:GAW]=Address Space Root [63:GAW]

Host Physical Address [GAW−1:0]=Guest Physical Address [GAW−1:0]

Fault Processing:

DMA requests blocked by the DMA remapping circuit 135 results in faults. The DMA remapping circuit 135 defines two types of faults: (a) address translation faults and (b) address filtering faults. DMA requests that are blocked in the process of GPA-to-HPA address translation result in address translation faults. Blocked DMA requests from devices assigned to a non-relocated domain, and hence address filtered, result in address filtering faults.

Address translation faults are faults detected by the DMA remapping circuit 135 in the process of GPA-to-HPA translation. Address translation faults may occur under any of the following conditions: (1) The Present (P) field in the context entry used to process the DMA request is negated. This could be a context entry in one of the context tables or the default context; (2) The DMA request attempts to access a GPA beyond the domain's guest physical address space limit of $2^{GAW}-1$, where GAW is the guest address width field in the context entry used to process the DMA request (e.g., the GAW field 836 in FIG. 8B); (3) The DMA request attempts to access guest physical addresses across a 4 KB page boundary; (4) The Present (P) field in a page-table entry used for GPA-to-HPA translation of the DMA request is negated; (5) The read/write (R/W) field (e.g., the RW field 856 in FIG. 8C) in a page table entry used for GPA-to-HPA translation of the DMA request is negated indicating only DMA reads are allowed, and the DMA request is a write.

Translation faults are processed by recording the fault information and reporting them to the software. The fault recording is defined through a memory-resident fault log. The software is expected to program the base of the page-aligned 4 KB-sized fault log region to the fault log register.

The DMA remapping circuit 135 may log up to any number of fault records in the fault log. In one embodiment, this number is 256. Each fault record contains the following fields: (1) Fault Reason: The fault reason field indicates the specific condition that caused the translation fault; (2) Type: The type field provides the type (e.g., write or read request) of the DMA request that faulted; (3) Source ID: The source ID field provides the requester identifier in the faulted DMA request; (4) Address: The address field provides the GPA in the faulted DMA request; (5) Length: The length field provides the size of data payload (e.g., number of DWORDs) in the faulted DMA request.

The DMA remapping circuit 135 manages the current pointer to the next writable entry in the fault log. If the DMA remapping circuit 135 detects a new fault while the fault log is full, the fault is not recorded and the fault log overflow status (FLO) field in the error status register is asserted. Future faults are not recorded until the software re-initializes the fault log register.

The software can enable or disable recording of all address translation faults through the fault log register. When fault recording is enabled in the fault log register, fault recording is controlled through the fault processing field in the context entry used to process the DMA request (e.g., the fault processing field 840 in the context entry 535 in FIG. 8B).

Faults events are reported to software using a message signaled interrupt (MSI). The fault events are controlled through the fault event control register. The fault event information, such as interrupt vector, delivery mode, address etc., are programmed through the fault event data and fault event address registers.

The DMA remapping circuit 135 generates the fault event interrupt message when the first fault is recorded to the fault log. The interrupt message is auto-disabled and requires the software to explicitly re-arm the interrupt generation. The DMA remapping circuit 135 may process faults and log them to the fault log, before the fault event from the first fault is received and processed by software. To allow the DMA remapping circuit 135 to continue recording of faults, the software is expected to program the fault log register with a new fault log region, before processing the faults reported in the fault log.

Address filtering faults are faults detected by the DMA remapping circuit 135 when address filtering DMA requests from I/O devices are assigned to a non-relocated domain. A DMA request processed through context entries with the address-filter (AF) field asserted may cause address filtering faults under any of the following conditions:

1. The address decoding of the physical address indicated in the DMA request identifies it as a peer-to-peer request.
2. The DMA request attempts to access the memory across a 4 KB-page boundary.
3. The DMA request is accessing the memory region hosting the filter bitmap table, and the filter table protect (FTP) field is asserted in the filter control register.
4. The DMA request attempts to access a GPA beyond the domain's guest physical address space limit of $(2^{(P+27)}-1)$, where P is the value programmed in the filter bitmap size register.
5. The filter bitmap table entry corresponding to the page accessed by the DMA request is asserted, indicating access to the page is blocked.

Unlike address translation faults which can be recorded in the fault log, the address filtering faults are reported through the filter fault register. The filter fault register records information about the first detected address filtering fault.

In addition to the translation and address filtering faults, there may be other error conditions. The DMA remapping circuit 135 may encounter the following other types of errors: (1) Erroneous programming of DMA remapping registers detected by hardware. For example, programming of hardware registers to use features that are reported as not supported through the capability register. The DMA remapping circuit 135 may report these kinds of general programming errors through the error status register. DMA requests from one or more devices may be affected until the error condition is fixed; (2) Erroneous programming of the data structures, such as the context table entries or page table entries, to use features beyond those reported through the capability register. These types of errors may be detected by the DMA remapping circuit 135 as part of a context entry load or during a page table walk. Since these are typically detected as part of processing a DMA request, these are treated as translation faults. The fault reason codes in the fault record identifies these error types.

Figure 10:
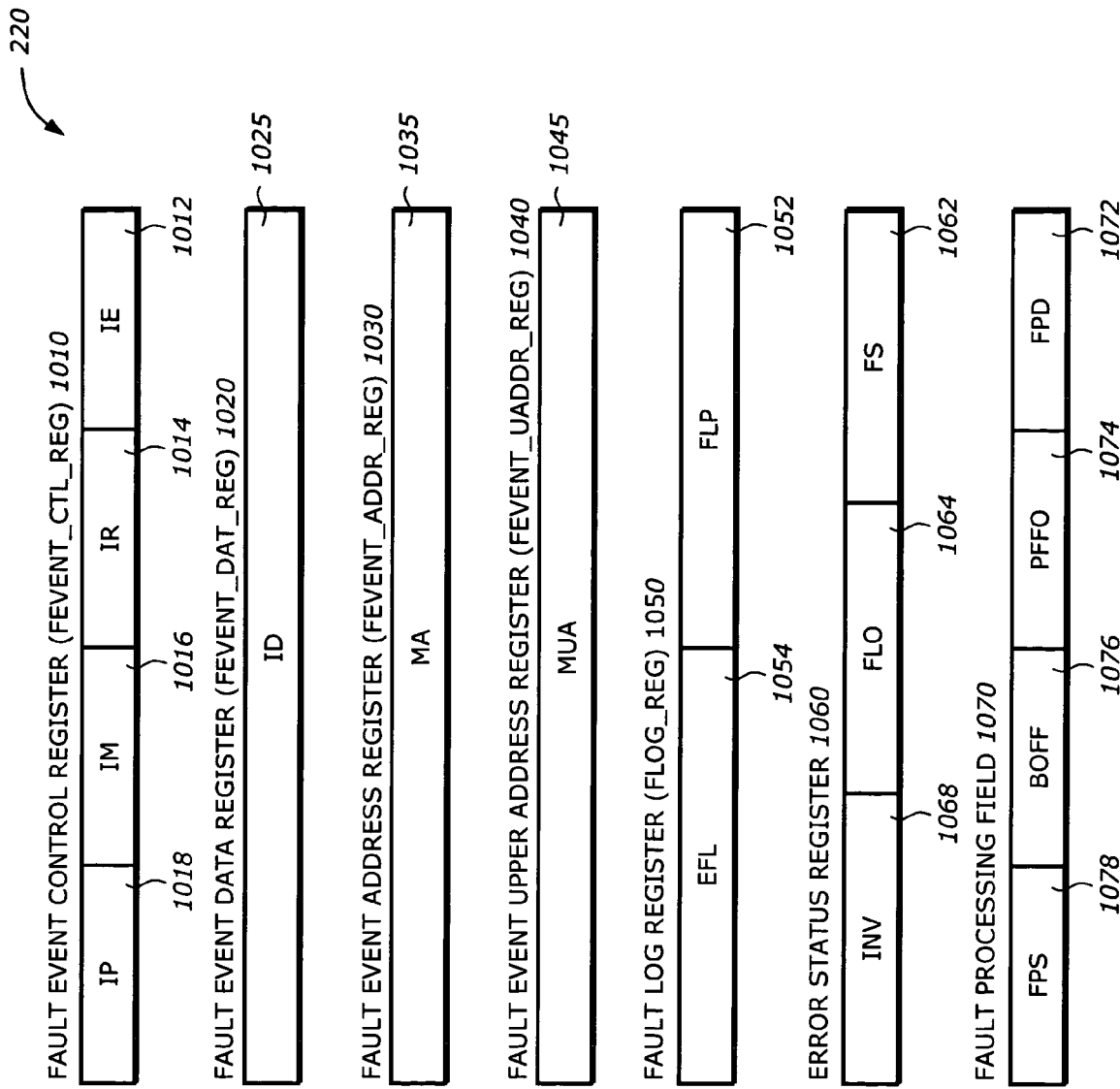
FIG. 10 is a diagram illustrating a register set containing fault processing registers according to one embodiment of the invention.

FIG. 10 is a diagram illustrating the register set 220 containing fault processing registers according to one embodiment of the invention. The register set 220 includes a fault event control register (FEVENT_CTL_REG) 1010, a fault event data register (FEVENT_DAT_REG) 1020, a fault event address register (FEVENT_ADDR REG) 1030, a fault event upper address register (FEVENT_UADDR_REG) 1040, a fault log register (FLOG_REG) 1050, an error status register (ERR_REG) 1060, and the fault processing fields 1070.

The REVENT_CTL_REG 1010 specifies the fault event interrupt message control bits. It includes an interrupt message enable (IE) field 1012, an interrupt message re-arm (IR) field 1014, an interrupt message mask (IM) field 1016, and an interrupt message pending (IP) field 1018.

The interrupt message enable (IE) field indicates if the interrupt service is available. When negated, it indicates that the hardware is prohibited from issuing interrupt message requests. This field is negated on reset. When asserted, it indicates that the interrupt service is available. When a faulting condition is detected, the DMA remapping circuit 135 may issue an interrupt request using the fault event data and fault event address register values depending on the state of the interrupt mask and pending bits. Irrespective of the setting of this field, translation faults while processing a DMA request are reported only if the fault record used to process the fault has the fault recording control (FRC) field negated.

The IR field 1014 indicates if the fault event generation is auto-disabled. When an interrupt message is generated, the DMA remapping circuit 135 asserts this field to indicate that the fault event generation is auto-disabled. The software need to explicitly negate this field to re-arm the fault events.

The IM field 1016 field indicates interrupt masking. When negated, it indicates no masking of interrupt. When asserted, it indicates that software has masked the interrupt. The DMA remapping circuit 135 is prohibited from sending the interrupt message.

The IP field 1018 indicates interrupt pending. While the IM field 1016 is asserted, the DMA remapping circuit 135 is prohibited from sending the interrupt message. Instead, the DMA remapping circuit 135 asserts the IP field 1018 whenever it would have otherwise send the interrupt message. When the software unmasks the interrupt, and if the IP field 1018 is asserted, the DMA remapping circuit 135 should schedule sending the interrupt message, and negated this field as soon as the interrupt message has been sent.

The FEVENT_DATA_REG 1020 specifies the interrupt message data. It includes an interrupt-message data (ID) field 1025. The ID field 1025 contains a data value in the fault event interrupt message.

The FEVENT_ADDR_REG 1030 specifies the interrupt message address. The software should program this register by writing to the lower DWORD last. It includes a message address (MA) field 1035. When fault events are enabled, the contents of this register specify the DWORD-aligned address for the message signaled interrupt (MSI) memory write transaction.

The FEVENT_UADDR_REG 1040 specifies the interrupt message address. The software should program this register by writing to the lower DWORD last. The message upper address (MUA) function needs to be implemented only if the DMA remapping circuit 135 supports 64-bit message addresses. If implemented, the contents of this register specify the upper 32-bits of a 64-bit MSI write transaction. If the DMA remapping circuit 135 does not support 64-bit messages, the register is treated as read-only.

The FLOG_REG 1050 sets up the base address of memory-resident fault log region. The software should program this register by writing to the lower DWORD last. It includes a fault log region pointer (FLP) field 1052 and an enable fault log (EFL) field 1054. The FLP field 1052 points to base of a page-aligned, 4 KB-sized fault log region in the system memory. The EFL field 1054 is a control field to enable or disable the fault log. When negated, it indicates disabling fault log. When this field is negated, the fault log region pointer field is ignored and faulting DMA requests are not recorded. When asserted, it indicates enabling the use of context entry to process DMA requests. The root and context tables should be setup in memory and the base of the root table should be provided in the FLP field 1052.

The ERR_REG 1060 indicates the hardware error status. Writes to this register negates the field. It has a fault status (FS) field 1062, a fault log overflow (FLO) field 1064, and an invalid programming (INV) field 1068. The FS field 1062 is asserted by the DMA remapping circuit 135 to indicate faults when the fault log is not enabled. A software write to the ERR_REG 1060 negates this field. The FLO field 1064 is asserted by the DMA remapping circuit 135 to indicate a fault log overflow condition. A software write to the ERR_REG 1060 negates this field. The INV field 1068 is asserted to indicate invalid programming of a register in the DMA remapping circuit 135 registers. A software write to the ERR_REG 1060 negates this field.

The fault processing fields 1070 include a fault processing disable field (FPD) 1072, a process first fault only (PFFO) field 1074, a block on first fault (BOFF) field 1076, and a fault pending status (FPS) field 1078.

The FPD field 1072 enables or disables processing of faults from DMA requests processed through the corresponding context entry. When negated, it indicates that the fault processing is enabled for DMA requests processed through this context entry. The DMA remapping circuit 135 processes the faults based on the programming of the PFFO field 1074. When asserted, it indicates the fault processing is disabled for DMA requests processed through this context entry.

The PFFO field 1074 is used to specify to the DMA remapping circuit 135 to record and report only the first fault for DMA requests processed through the corresponding context entry. The DMA remapping circuit 135 uses the fault pending status (FPS) field 1078 to provide this behavior. When negated, the DMA remapping circuit 135 records all faults. When asserted, the DMA remapping circuit 135 checks the FPS field 1078 to determine if the fault should be recorded. If FPS field 1078 is asserted, the fault is ignored. If FPS field 1078 is negated, the fault is processed as follows: asserting the FPS field 1078; then if the fault log register specifies fault log is enabled, and the fault log is not full, the fault is recorded in the fault log. If the fault log is full, the FLO field 1064 in the error status register 1060 is asserted The BOFF field 1076 is valid only when the PFFO field 1074 is asserted. On faults, the DMA remapping circuit 135 evaluates this field after evaluating the PFFO field 1074. When negated, the fault is processed according to the setting of the PFFO field 1074. When asserted, if processing of the PFFO field 1074 causes the FPS field 1078 to be asserted, the P field in the context entry is negated. The DMA remapping circuit 135 ensures the update to the present (P) field is visible to the processing of all following DMA requests, using this context entry.

The FPS field 1078 is used in conjunction with the PFFO field 1074. If the PFFO field 1074 is asserted and the FPS field 078 is asserted, the DMA remapping circuit 135 ignores all faults detected when processing DMA requests using the corresponding context entry. The software negates this field and flushes the context entry cache to restart recording of faults for DMA requests processed through this context entry. If the PFFO field 1074 is asserted and the FPS field 1078 is negated, the DMA remapping circuit 135 asserts the FPS field 1078 when the first fault is detected from a DMA request processed through the context entry.

Figure 11:
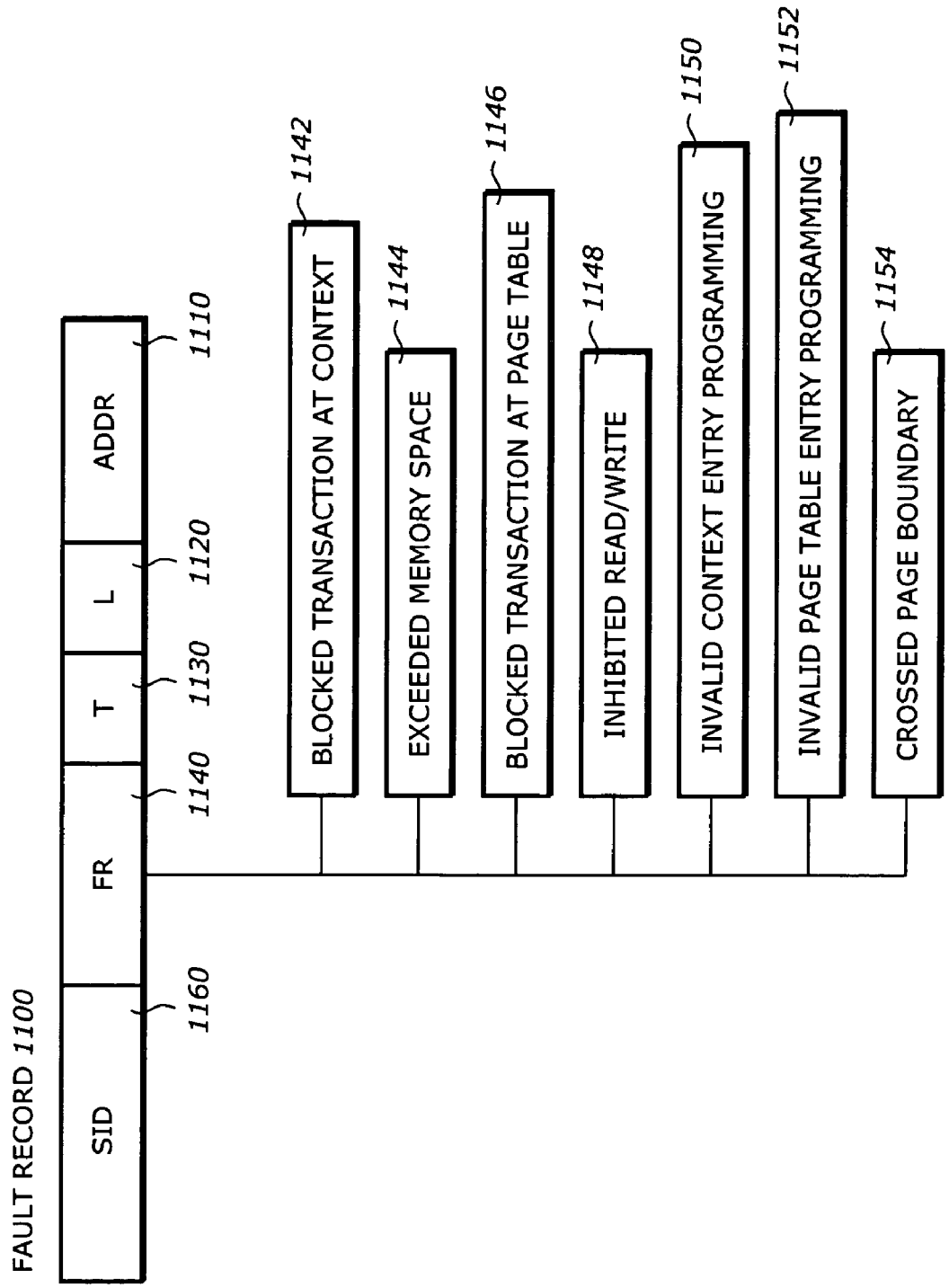
FIG. 11 is a diagram illustrating a fault record according to one embodiment of the invention.

FIG. 11 is a diagram illustrating a fault record 1100 according to one embodiment of the invention. The fault record 1100 includes an ADDR field 1110, a length (L) field 1120, a type (T) field 1130, a fault reason (FR) field 1140, and a source identifier (SID) field 1160.

The ADDR field 110 is the address in the faulted DMA request. The least significant host address width bits contains the faulting address. The L field 1120 is a data payload size (e.g., number of DWORDs) in the faulted DMA request. The T field 1130 is a memory access type of faulted DMA request. When negated, it indicates a DMA Write. When asserted, it indicates a DMA Read. The FR field 1140 indicates a reason for DMA request faulting. It includes a blocked transaction at context 1142, an exceeded memory space 1144, a blocked transaction at page table 1146, an inhibited read/rite 1148, an invalid context entry programming 1150, an invalid page table entry programming 1152, and a crossed page boundary 1154. The SID field 1160 is a requester identifier in the faulted DMA request.

Figure 12:
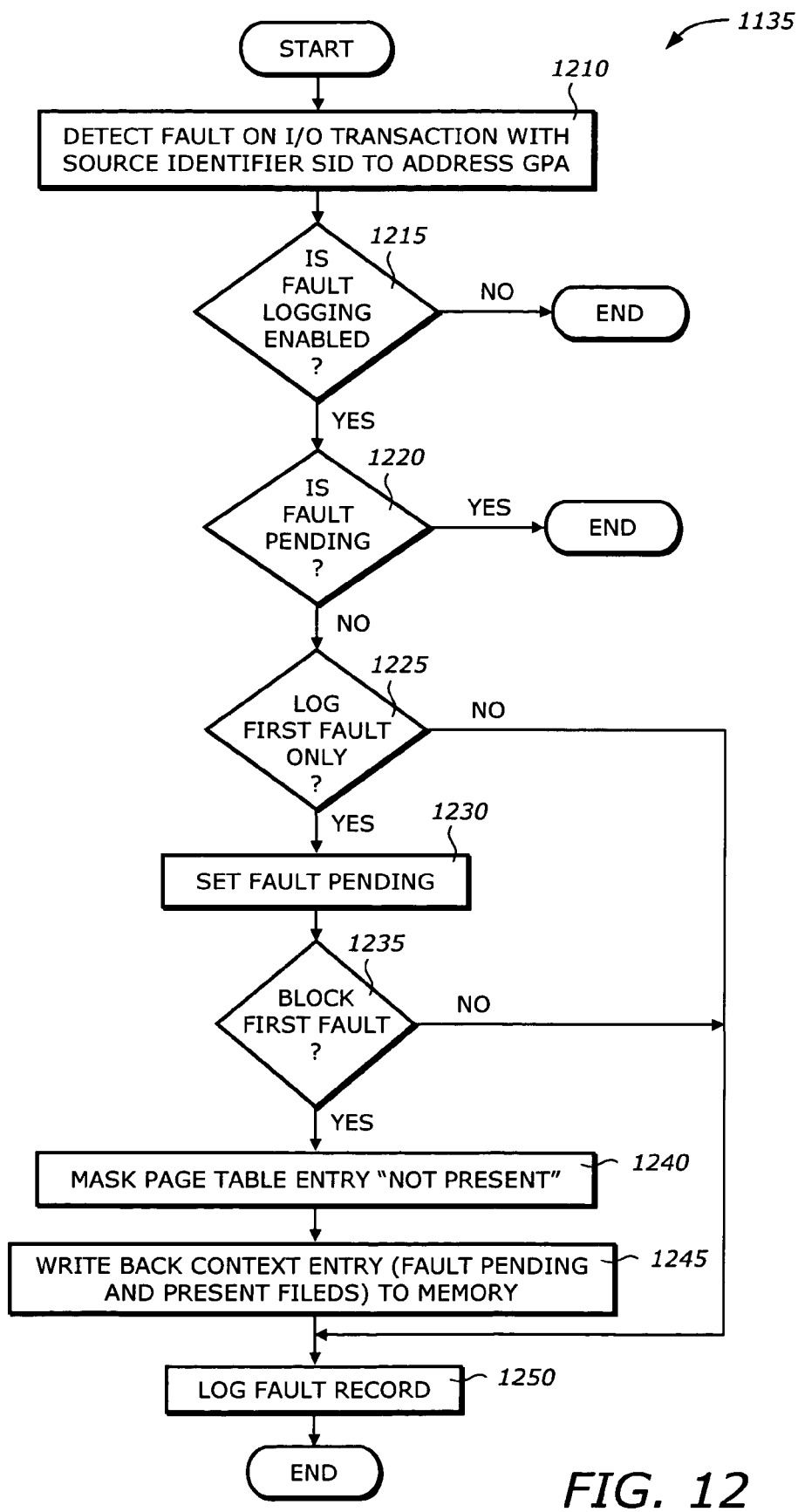
FIG. 12 is a flowchart illustrating a process to perform fault processing according to one embodiment of the invention.

FIG. 12 is a flowchart illustrating a process 1200 to perform fault processing according to one embodiment of the invention.

Upon START, the process 1200 detects a fault on an I/O transaction with a source identifier SID and to the address GPA (Block 1210). Then, the process 1210 determines if the fault logging is enabled (Block 1215). If not, the process 1200 is terminated. Otherwise, the process 1200 determines if this is a pending fault (Block 1220). If so, the process 1200 is terminated. Otherwise, the process 1200 determines if it is desired to log the first fault only (Block 1225). If not, the process 1200 proceeds to Block 1250. Otherwise, the process 1200 sets a flag or status indicator to indicate that the fault is pending (Block 1230).

Then, the process 1200 determines if it is desired to block the first fault (Block 1235). If not, the process 1200 proceeds to Block 1250. Otherwise, the process 1200 marks the page table entry as "not present" (Block 1240). Next, the process 1200 writes back the context entry with the fault pending and present fields to the memory (Block 1245). Then, the process 1200 logs the fault record (Block 1250) and is then terminated.

Figure 13:
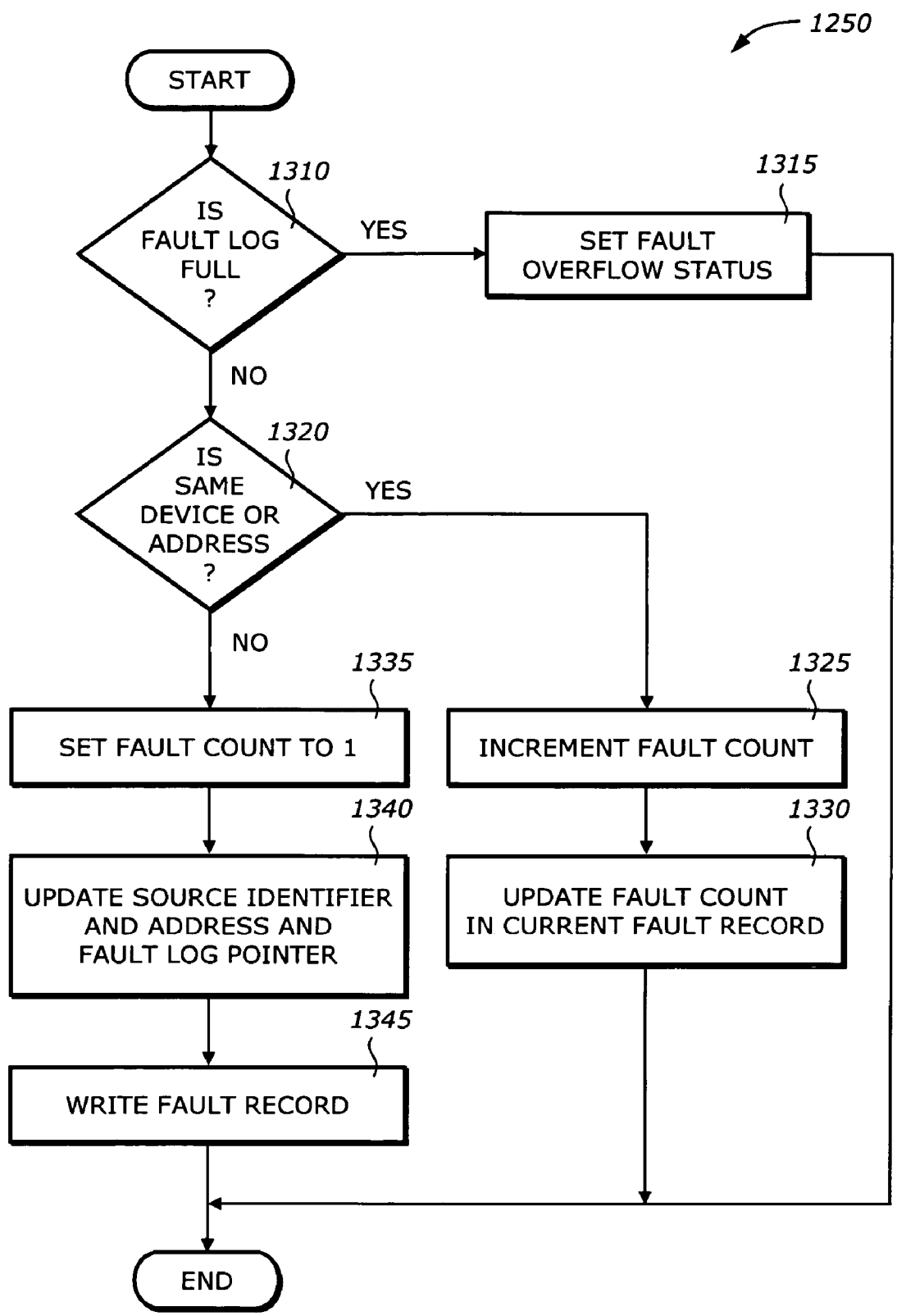
FIG. 13 is a flowchart illustrating a process to log fault record according to one embodiment of the invention.

FIG. 13 is a flowchart illustrating the process 1250 to log fault record according to one embodiment of the invention.

Upon START, the process 1250 determines if the fault log is full (Block 1310). If so, the process 1250 asserts a fault overflow status or flag (Block 1315) and is then terminated. Otherwise, the process 1250 determines if the fault was generated by the same device or to the same address (Block 1320). This may be performed by comparing the current SID with the previously saved SID, or the current GPA with the previously saved GPA. If the fault is caused by the same device or to the same address, the process 1250 increments or updates the fault count for the device or the address (Block 1325). Next, the process 1250 updates the fault count in the current fault record (Block 1330) and is then terminated. If the fault is not caused by the same device or to the same address, the process 1250 sets the fault count to one (Block 1335). Next, the process 1250 updates the SID, the GPA, and the fault log pointer for the current fault (Block 1340). Then, the process 1250 writes the fault record to the fault log (Block 1345) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a register set to store global control or status information for fault processing of a fault generated by an input/output (I/O) transaction requested by an I/O device, the register set including
      a fault log register to store recording control information to record fault information in a fault log,
      a fault reporting register to store reporting control information to report the fault; and
      an address translation structure to translate a guest physical address to a host physical address, the guest physical address corresponding to the I/O transaction and mapped to a domain, the address translation structure having at least an entry associated with the domain and domain-specific control information for the fault processing.

2. The apparatus of claim 1 wherein the fault log register comprises:
   a fault log enable field to enable recording the fault information; and
   a fault log pointer to point to a fault log region in a memory that stores the fault information.

3. The apparatus of claim 1 wherein the fault information includes at least one of a source identifier identifying the I/O device, a fault reason, an access type, a length of data in the I/O transaction, and an address of the I/O transaction.

4. The apparatus of claim 3 wherein the fault reporting register comprises:
   a fault event control register to store interrupt message control information;
   a fault event data register to store interrupt message data; and
   a fault event address register to store address of memory for an interrupt message write transaction.

5. The apparatus of claim 1 wherein the register set further comprises:
   an error status register to store error status information.

6. The apparatus of claim 1 wherein the address translation structure comprises:
   a root table to store root entries indexed by a source identifier identifying the I/O device; and
   a context table coupled to the root table to store context entries referenced by the root entries, the context entries including the at least entry.

7. The apparatus of claim 6 wherein the address translation structure further comprises:
   a plurality of multi-level page tables, each having configurable size and containing page table entries, each of the page table entries providing base of a next level page table or base of page of the host physical address.

8. The apparatus of claim 6 wherein the address translation structure further comprises:
   a single page table having size dependent on page size and a guest physical address size, the single page table containing page table entries, each of the page table entries providing base of page of the host physical address.

9. The apparatus of claim 6 wherein each of the context entries comprises:
   a domain identifier to identify the domain;
   an address space root to define base of the host physical address of the domain or a page table in the address translation structure;
   at least a translation attribute to characterize a translation mechanism used by the address translation structure; and
   at least a fault processing attribute to characterize the domain-specific control information for the domain specified by the domain specifier.

10. The apparatus of claim 9 wherein the address translation structure further comprises:
    a base/bounds translation mechanism using the address space root as base of page of the host physical address.

11. The apparatus of claim 9 wherein the domain-specific control information includes a fault pending status field, a block on first fault field, a process first fault field, and a fault processing disable field.

12. The apparatus of claim 9 wherein each of the context entries further comprises:
an address filter field to enable address filtering using a bitmap table.

13. The apparatus of claim 12 wherein the fault is one of an address translation fault and an address filtering fault.

14. A method comprising:
storing global control or status information in a register set for fault processing of a fault generated by an input/output (I/O) transaction requested by an I/O device, wherein storing the global control and status information includes,
storing recording control information in a fault log register to record fault information in a fault log, and
storing reporting control information in a fault reporting register to report the fault; and
translating a guest physical address to a host physical address using an address translation structure, the guest physical address corresponding to the I/O transaction and mapped to a domain, the address translation structure having at least an entry associated with the domain and domain-specific control information for the fault processing.

15. The method of claim 14 wherein storing recording control information comprises:
enabling recording the fault information using a fault log enable field; and
pointing to a fault log region in a memory that stores the fault information using a fault log pointer.

16. The method of claim 14 wherein the fault information includes at least one of a source identifier identifying the I/O device, a fault reason, an access type, a length of data in the I/O transaction, and an address of the I/O transaction.

17. The method of claim 16 wherein storing reporting control information comprises:
storing interrupt message control information in a fault event control register;
storing interrupt message data in a fault event data register; and
storing address of memory for an interrupt message write transaction in a fault event address register.

18. The method of claim 14 wherein storing global control or status information further comprises:
storing error status information in an error status register.

19. The method of claim 14 wherein translating comprises:
storing root entries indexed by a source identifier identifying the I/O device in a root table; and
storing context entries referenced by the root entries in a context table, the context entries including the at least entry.

20. The method of claim 19 wherein translating further comprises:
providing base of a next level page table or base of page of the host physical address using each of page table entries in a plurality of multi-level page tables, each of the page tables having configurable size.

21. The method of claim 19 wherein translating further comprises:
providing base of page of the host physical address using each of page table entries in a single page table having size dependent on page size and a guest physical address size.

22. The method of claim 19 wherein storing the context entries comprises:
identifying the domain using a domain identifier;
defining base of the host physical address of the domain or a page table in the address translation structure using an address space root;
characterizing a translation mechanism used by the address translation structure using at least a translation attribute; and
characterizing the domain-specific control information for the domain specified by the domain specifier using at least a fault processing attribute.

23. The method of claim 22 wherein translating further comprises:
using the address space root as base of page of the host physical address in a base/bounds translation mechanism.

24. The method of claim 22 wherein the domain-specific control information includes a fault pending status field, a block on first fault field, a process first fault field, and a fault processing disable field.

25. The method of claim 22 wherein storing the context entries further comprises:
enabling address filtering using a bitmap table in an address filter field.

26. The method of claim 25 wherein the fault is one of an address translation fault and an address filtering fault.

27. A system comprising:
a memory;
an input/output (I/O) device generating a guest physical address in an I/O transaction to access the memory; and
a chipset coupled to the I/O device and the memory, the chipset including a circuit, the circuit comprising:
a register set to store global control or status information for fault processing of a fault generated by the I/O transaction, the register set including
a fault log register to store recording control information to record fault information in a fault log, and
a fault reporting register to store reporting control information to report the fault; and
an address translation structure to translate the guest physical address to a host physical address, the guest physical address corresponding to the I/O transaction and mapped to a domain, the address translation structure having at least an entry associated with the domain and domain-specific control information for the fault processing.

28. The system of claim 27 wherein the fault log register comprises:
a fault log enable field to enable recording the fault information; and
a fault log pointer to point to a fault log region in a memory that stores the fault information.

29. The system of claim 27 wherein the fault information includes at least one of a source identifier identifying the I/O device, a fault reason, an access type, a length of data in the I/O transaction, and an address of the I/O transaction.

30. The system of claim 29 wherein the fault reporting register comprises:
a fault event control register to store interrupt message control information;
a fault event data register to store interrupt message data;
a fault event address register to store address of memory for an interrupt message write transaction.

31. The system of claim 27 wherein the register set further comprises:
an error status register to store error status information.

32. The system of claim 27 wherein the address translation structure comprises:
a root table to store root entries indexed by a source identifier identifying the I/O device; and
a context table coupled to the root table to store context entries referenced by the root entries, the context entries including the at least entry.

33. The system of claim 32 wherein the address translation structure further comprises:
a plurality of multi-level page tables, each having configurable size and containing page table entries, each of the page table entries providing base of a next level page table or base of page of the host physical address.

34. The system of claim 32 wherein the address translation structure further comprises:
a single page table having size dependent on page size and a guest physical address size, the single page table containing page table entries, each of the page table entries providing base of page of the host physical address.

35. The system of claim 32 wherein each of the context entries comprises:
a domain identifier to identify the domain;
an address space root to define base of the host physical address of the domain or a page table in the address translation structure;
at least a translation attribute to characterize a translation mechanism used by the address translation structure; and
at least a fault processing attribute to characterize the domain-specific control information for the domain specified by the domain specifier.

36. The system of claim 35 wherein the address translation structure further comprises:
a base/bounds translation mechanism using the address space root as base of page of the host physical address.

37. The system of claim 35 wherein the domain-specific control information includes a fault pending status field, a block on first fault field, a process first fault field, and a fault processing disable field.

38. The system of claim 35 wherein each of the context entries further comprises:
an address filter field to enable address filtering using a bitmap table.

39. The system of claim 38 wherein the fault is one of an address translation fault and an address filtering fault.

40. An article of manufacture comprising:
a machine-accessible medium including data that, when accessed by a machine, causes the machine to perform operations comprising:
storing global control or status information in a register set for fault processing of a fault generated by an input/output (I/O) transaction requested by an I/O device, wherein storing the global control and status information comprises data that cause the machine to perform operations includes,
storing recording control information in a fault log register to record fault information in a fault log; and
storing reporting control information in a fault reporting register to report the fault
translating a guest physical address to a host physical address using an address translation structure, the guest physical address corresponding to the I/O transaction and mapped to a domain, the address translation structure having at least an entry associated with the domain and domain-specific control information for the fault processing.

41. The article of manufacture of claim 40 wherein the data causing the machine to perform storing recording control information comprises data that cause the machine to perform operations comprising:
enabling recording the fault information using a fault log enable field; and
pointing to a fault log region in a memory that stores the fault information using a fault log pointer.

42. The article of manufacture of claim 40 wherein the fault information includes at least one of a source identifier identifying the I/O device, a fault reason, an access type, a length of data in the I/O transaction, and an address of the I/O transaction.

43. The article of manufacture of claim 42 wherein the data causing the machine to perform storing reporting control information comprises data that cause the machine to perform operations comprising:
storing interrupt message control information in a fault event control register;
storing interrupt message data in a fault event data register; and
storing address of memory for an interrupt message write transaction in a fault event address register.

44. The article of manufacture of claim 40 wherein the data causing the machine to perform storing global control or status information further comprises data that cause the machine to perform operations comprising:
storing error status information in an error status register.

45. The article of manufacture of claim 40 wherein the data causing the machine to perform translating comprises data that cause the machine to perform operations comprising:
storing root entries indexed by a source identifier identifying the I/O device in a root table; and
storing context entries referenced by the root entries in a context table, the context entries including the at least entry.

46. The article of manufacture of claim 45 wherein the data causing the machine to perform translating further comprises data that cause the machine to perform operations comprising:
providing base of a next level page table or base of page of the host physical address using each of page table entries in a plurality of multi-level page tables, each of the page tables having configurable size.

47. The article of manufacture of claim 45 wherein the data causing the machine to perform translating further comprises data that cause the machine to perform operations comprising:
providing base of page of the host physical address using each of page table entries in a single page table having size dependent on page size and a guest physical address size.

48. The article of manufacture of claim 45 wherein the data causing the machine to perform storing the context entries comprises data that cause the machine to perform operations comprising:
identifying the domain using a domain identifier;
defining base of the host physical address of the domain or a page table in the address translation structure using an address space root;
characterizing a translation mechanism used by the address translation structure using at least a translation attribute; and characterizing the domain-specific control information for the domain specified by the domain specifier using at least a fault processing attribute.

49. The article of manufacture of claim 48 wherein the data causing the machine to perform translating further comprises data that cause the machine to perform operations comprising:

using the address space root as base of page of the host physical address in a base/bounds translation mechanism.

50. The article of manufacture of claim 48 wherein the domain-specific control information includes a fault pending status field, a block on first fault field, a process first fault field, and a fault processing disable field.

51. The article of manufacture of claim 48 wherein the data causing the machine to perform storing the context entries further comprises data that cause the machine to perform operations comprising:

enabling address filtering using a bitmap table in an address filter field.

52. The article of manufacture of claim 51 wherein the fault is one of an address translation fault and an address filtering fault.

* * * * *